US008705769B2

(12) United States Patent
Vickers

(10) Patent No.: US 8,705,769 B2
(45) Date of Patent: Apr. 22, 2014

(54) TWO-TO-THREE CHANNEL UPMIX FOR CENTER CHANNEL DERIVATION

(75) Inventor: Earl C. Vickers, Saratoga, CA (US)

(73) Assignee: STMicroelectronics, Inc., Coppell, TX (US)

( * ) Notice: Subject to any disclaimer, the term of this patent is extended or adjusted under 35 U.S.C. 154(b) by 1253 days.

(21) Appl. No.: 12/561,095

(22) Filed: Sep. 16, 2009

(65) Prior Publication Data

US 2010/0296672 A1 Nov. 25, 2010

Related U.S. Application Data

(60) Provisional application No. 61/180,047, filed on May 20, 2009.

(51) Int. Cl.
*H04B 1/00* (2006.01)

(52) U.S. Cl.
USPC .............................................. 381/119; 381/27

(58) Field of Classification Search
USPC ........... 381/27, 17, 18, 19–21, 23, 1, 97, 102, 381/119
See application file for complete search history.

(56) References Cited

U.S. PATENT DOCUMENTS 8,045,719 B2 * 10/2011 Vinton ............................ 381/27
2009/0080666 A1 * 3/2009 Uhle et al. ...................... 381/17

OTHER PUBLICATIONS

Carlos Avendano and Jean-Marc Jot, “A Frequency-Domain Approach to Multichannel Upmix,” J. Audio Eng. Soc., vol. 52, No. 7/8, Jul./Aug. 2004.

Roy Irwan and Ronald Aarts, “Two-to-Five Channel Sound Processing,” J. Audio Eng. Soc., vol. 50, pp. 914-926, Nov. 2002.

Andreas Walther, Christian Uhle, and Sascha Disch, “Using Transient Suppression in Blind Multi-channel Upmix Algorithms,” presented at the AES 122nd Convention, Vienna Austria, paper 6990, May 5-8, 2007.

Jean-Marc Jot and Carlos Avendano, “Spatial Enhancement of Audio Recordings,” presented at the AES 23rd International Conference, Copenhagen, Denmark, May 23-25, 2003.

Christof Faller, “Multiple-Loudspeaker Playback of Stereo Signals,” J. Audio Eng. Soc., vol. 54., No. 11, pp. 1051-1064, Nov. 2006.

Juha Merimaa, Michael M. Goodwin, and Jean-Marc Jot, “Correlation-Based Ambience Extraction from Stereo Recordings,” presented at the AES 123rd Convention, New York, NY, paper 7282, Oct. 5-8, 2007.

Michael M. Goodwin and Jean-Marc Jot, “Primary-ambient signal decomposition and vector-based localization for spatial audio coding and enhancement,” Proc. IEEE Int. Conf. on Acoust., Speech, and Signal Processing, Honolulu, HI, USA, Apr. 2007.

(Continued)

*Primary Examiner* — Vivian Chin
*Assistant Examiner* — Friedrich W Fahnert
(74) *Attorney, Agent, or Firm* — Beyer Law Group LLP

(57) ABSTRACT

A frequency-domain upmix process uses vector-based signal decomposition and methods for improving the selectivity of center channel extraction. The upmix processes described do not perform an explicit primary/ambient decomposition. This reduces the complexity and improves the quality of the center channel derivation. A method of upmixing a two-channel stereo signal to a three-channel signal is described. A left input vector and a right input vector are added to arrive at a sum magnitude. Similarly, the difference between the left input vector and the right input vector is determined to arrive at a difference magnitude. The difference between the sum magnitude and the difference magnitude is scaled to compute a center channel magnitude estimate, and this estimate is used to calculate a center output vector. A left output vector and a right output vector are computed. The method is completed by outputting the left output vector, the center output vector, and the right output vector.

34 Claims, 11 Drawing Sheets

(56) References Cited

OTHER PUBLICATIONS

Avery Lee, "The 'Center Cut' Algorithm," http://www.virtualdub.org/blog/pivot/entry.php?id=102, May 21, 2006.
Moitah (moitah@yahoo.com), "Center Cut DSP Plugin for Winamp 2/5", dsp_centercut.cpp, http://www.moitah.net/download/latest/dsp_centercut.zip.
Michael M. Goodwin, "Geometric Signal Decompositions for Spatial Audio Enhancement," Proc. IEEE International Conference on Acoustics, Speech, and Signal Processing, Apr. 2008.
Aki Härmä and Christof Faller, "Spatial Decomposition of Time-Frequency Regions: Subbands or Sinusoids," presented at the AES 116th Convention, Berlin, Germany, May 8-11, 2004.

* cited by examiner

TWO-TO-THREE CHANNEL UPMIX FOR CENTER CHANNEL DERIVATION

CROSS-REFERENCE TO RELATED APPLICATIONS

This application claims priority under 35 U.S.C. §119(e) to Provisional Patent Application Ser. No. 61/180,047, filed May 20, 2009 entitled "Method and Apparatus for Center Channel Derivation and Speech Enhancement" by Vickers, which is incorporated by reference herein in its entirety.

BACKGROUND

1. Field of the Invention

This invention relates generally to audio engineering. More specifically, it relates to upmixing two-channel audio to three or more output channels.

2. Related Art

Presently, there are two categories of two- to three (or more)-channel upmix algorithms: multichannel converters and ambience generators.

Multichannel converters, which include linear ("passive") and steered ("active") matrix methods, are used to derive additional loudspeaker signals in cases where there are more speakers than input channels. These methods are typically implemented in the time domain. While linear matrix methods are relatively inexpensive to implement, they reduce the width of the front image. In a two- to three-channel upmix, any signal intended for the center is also played through the left and right speakers; the channel separation between left and center, for example, is only 3 dB.

Matrix steering methods update the matrix coefficients dynamically and provide the ability to extract and boost a dominant source. These methods are particularly useful for content such as movie soundtracks, in which one source may be of primary interest at any given time, but the signal-dependent gain changes may cause audible side effects with music.

Ambience generation methods attempt to extract or simulate the ambience of a recording. The term "ambience" refers to the components of a sound that create the impression of an acoustic environment, with sound coming from all around the listener but not from a specific place. Ambience may include room reverberation as well as other spatially distributed sounds such as applause, wind or rain. The goal of the ambience extraction is to increase the sense of envelopment, typically using the rear speakers.

Ambience generation methods may extract the natural reverberation from the audio signal, for example, by taking the difference of the left and right inputs, which attenuates centered sounds and preserves those that are weakly correlated or panned to the sides, or they may add artificial reverberation.

Recently, a number of researchers have developed frequency-domain upmix (and downmix) techniques for spatial audio coding and enhancement. These methods typically perform spatial decomposition and extract the existing ambience. Thus, these are categorized as ambience generation methods, but they can also be thought of as frequency-domain steering methods, because they dynamically change the panning of each frequency subband based on the correlation between the left and right input signals.

Frequency domain upmix techniques have been presented, based on inter-channel coherence measures, non-linear mapping functions and panning coefficients. Short-time Fourier transform (STFT)-based processing has been used to extract the ambient and direct components using least-squares estimation, Principal Components Analysis (PCA) and other methods.

One commercial upmix algorithm displays good center channel separation, but when the center channel is heard by itself, significant "watery sound" or "musical noise" artifacts are heard. Another commercial algorithm does not have obvious center channel artifacts, but it appears to have a low amount of center channel separation. There is a need for an upmix algorithm that provides good center channel separation without serious artifacts.

SUMMARY OF THE INVENTION

One aspect of the present invention is a method of upmixing a two-channel stereo signal to a three-channel signal. A left input vector and a right input vector are added to arrive at a sum magnitude of the two vectors. Similarly, the difference between the left input vector and the right input vector is determined to arrive at a difference magnitude. A magnitude of a target center output vector is estimated and this estimate is used to calculate a center output vector. A left output vector and a right output vector are computed. The method is completed by outputting a left output vector, the center output vector, and the right output vector.

In one embodiment, a unit vector having a direction corresponding with the sum of the left input vector and the right input vector is scaled by the estimated center magnitude in order to calculate the center output vector. In another embodiment, the difference magnitude is modified by taking a geometric mean of the sum and difference magnitudes. In another embodiment, energy normalization is performed by scaling the left, right, and center output vectors by the quotient of the input and output energies.

Another aspect of the present invention is a method of upmixing a two-channel stereo signal to a five-channel output signal. In the first stage of the process a two-channel stereo signal is upmixed to a three-channel signal having an intermediate left output vector, an intermediate center output vector, and an intermediate right output vector. In the next stage of the process the intermediate left and center output vectors are upmixed to a three-channel signal having a left output vector, a center-left output vector, and a first center output vector. The intermediate center and right output vectors are upmixed to a three-channel signal having a second center output vector, a center-right output vector, and a right output vector. The first center output vector and the second center output vector are added and scaled by 0.5 to produce a center output vector. The five-channel output signal consists of the left output vector, the center-left output vector, the center output vector, the center-right output vector, and the right output vector.

Another aspect of the invention is an apparatus for upmixing a two-channel input to a three-channel output. The apparatus includes a magnitude computation module that operates on a left input vector and a right input vector and computes a sum magnitude and a difference magnitude. Also included is a magnitude estimation module for estimating a center magnitude of a target center output vector. An output vector computation module calculates a center output vector, a left output vector, and a right output vector.

In one embodiment, the apparatus includes a scaling component that takes as input an estimated center magnitude that is used for scaling a unit vector having a direction corresponding with the sum of the left input vector and the right input vector. The output vector computation module accepts as input the left input vector, the right input vector, and the estimated center magnitude. In another embodiment, the apparatus may include a geometric mean computation module for modifying the magnitude of the difference of the left input vector and the right input vector. In another embodiment, an energy normalization module for normalizing the energy of the center output vector, the left output vector, and the right output vector is also contained in the apparatus. The normalization module computes the quotient of the input and output energies and multiplies the left output vector and the quotient, the right output vector and the quotient, and the center output vector and the quotient.

In another aspect of the invention, a method of improving center channel selectivity of an upmix process is described. A magnitude similarity measure relating to similarity of a left input vector magnitude and a right input vector magnitude is computed. The center magnitude estimate is scaled by the magnitude similarity measure to produce a scaled center magnitude estimate. The scaled center magnitude estimate is used to calculate a center output vector. A left output vector is computed by subtracting a portion of the center output vector from the left input vector. Similarly a right output vector is computed by subtracting a portion of the center output vector from the right input vector.

In yet another aspect of the invention, a method of extracting a left ambience vector and a right ambience vector from a left vector and a right vector is described. A magnitude similarity measure relating to the similarity of the magnitudes of the left vector and the right vector is computed. A left ambience vector is computed by multiplying the left vector by the magnitude similarity measure. Similarly, a right ambience vector is computed by multiplying the right vector by the magnitude similarity measure. A left output vector is derived by subtracting the left ambience vector from the left vector and a right output vector is derived by subtracting the right ambience vector from the right vector.

BRIEF DESCRIPTION OF THE DRAWINGS

References are made to the accompanying drawings, which form a part of the description and in which are shown, by way of illustration, particular embodiments.

DETAILED DESCRIPTION OF SPECIFIC EMBODIMENTS

Figure 1:
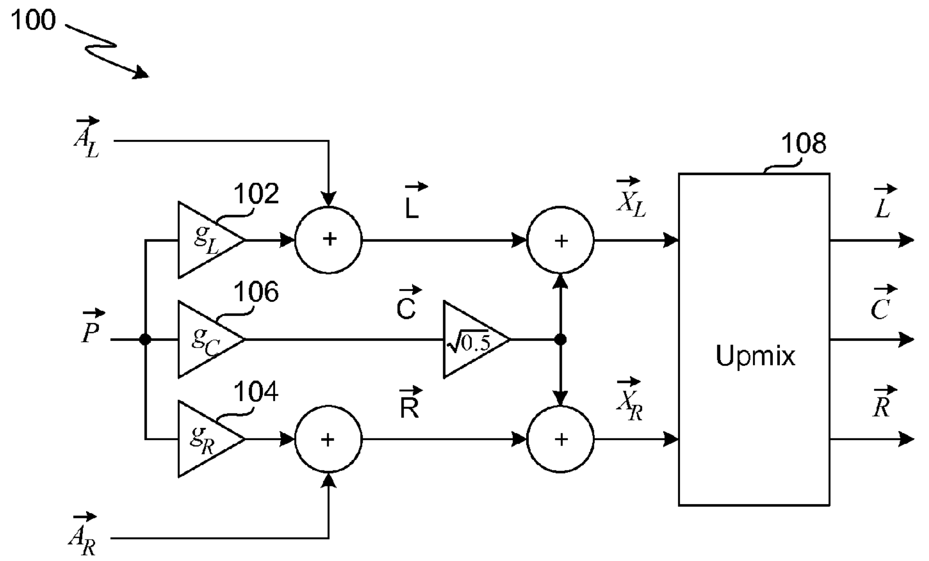
FIG. 1 is a block diagram depicting the presumed signal model.

Reference will now be made in detail to particular embodiments of the invention, examples of which are illustrated in the accompanying drawings. While the invention is described in conjunction with particular embodiments, it will be understood that it is not intended to limit the invention to the described embodiment. To the contrary, it is intended to cover alternatives, modifications, and equivalents as may be included within the spirit and scope of the invention as defined by the appended claims.

Methods and systems for upmixing a two-channel stereo input to a three or five-channel output signal are described in the various figures. While much of the currently available audio content uses a two-channel stereo format, there are many advantages to deriving a center channel signal, whether or not a physical center loudspeaker is available.

When there are only two front speakers, the phantom center tends to collapse toward the nearest speaker, due to the precedence effect. In addition, phantom center images can suffer from timbral modifications due to comb filtering. Adding a center speaker helps anchor the dialogue in the middle of a screen, providing a more stable center image, an enlarged sweet spot, and improved dialogue clarity.

Relatively few televisions come with 5.1 speaker systems, but a growing number of widescreen TVs include a built-in center speaker. Another use of two- to three-channel upmix is that it can be the first step in a two to five upmix in which the surround channels may be synthesized or derived from other signals.

Even if no physical center speaker is present, center channel derivation makes it easier to enhance the intelligibility of the dialogue, which is usually panned to the center. Once the center channel has been isolated, it can be boosted in proportion to the remaining channels, helping it to stand out from competing sounds such as music or sound effects, or the derived center channel can be filtered to amplify the voice frequencies.

The described embodiments are frequency-domain upmix processes using a vector-based signal decomposition, including methods for improving the selectivity of the center channel extraction.

Unlike most existing frequency-domain upmix methods, the described embodiments do not attempt an explicit primary/ambient decomposition. Instead, they focus on extracting a center channel, thereby reducing the complexity, improving the center channel separation, and maximizing the quality of the resulting center channel signal. Note that only spatial decomposition is attempted, which involves re-panning (perhaps dynamically) from two channels to three or more. The described embodiments do not attempt source separation, which involves explicitly recovering the original source signals.

Audio signals tend to be more sparse when represented in the frequency domain, which makes it easier to analyze their spatial orientation and separate their components accordingly. Therefore, the upmix methods of the described embodiments use a time-frequency analysis-synthesis framework.

In one embodiment, the short-time Fourier transform (STFT) is used, with Fourier transforms being implemented using the fast Fourier transform (FFT). Other time-frequency transforms, such as the Discrete Cosine Transform, wavelets, etc., could possibly be used in other embodiments. It may also be possible to group adjacent STFT subbands together to reduce computation or simulate the critical bands of the human hearing system.

Each STFT subband may be treated as a vector in time, as follows:

$$\vec{X}_L[k,l]=[x_L[k,l],x_L[k,l-1],\ldots]^T \quad (1)$$

$$\vec{X}_R[k,l]=[x_R[k,l],x_R[k,l-1],\ldots]^T, \quad (2)$$

where channel vectors $\vec{X}_L$ and $\vec{X}_R$ represent the left and right channels of the stereo input signal, and $x_L[k,l]$ and $x_R[k,l]$ are the (complex) STFT representations of the left and right input channels for a pair of time-frequency tiles with subband index k and time index l. Henceforth, the notation is simplified by dropping the k and l indices. For the signal model, the actual (or presumed) signal components will be denoted with calligraphic symbols (for example, $\vec{\mathcal{L}}$), and estimates (output signals) derived from various embodiments will use the normal italic symbols (e.g., $\vec{L}$).

The norm (length or absolute value) of a vector such as $\vec{X}_L$ may be shown as $$\|\vec{X}_L\|=\sqrt{\vec{X}_L\cdot\vec{X}_L}=\sqrt{\vec{X}_L^H\vec{X}_L}, \quad (3)$$

where $\|\ \|$ denotes the vector magnitude (or square root of the autocorrelation), the dot denotes the dot product, and $^H$ denotes Hermitian transposition.

All operations may be performed independently on each STFT subband. In addition, in the preferred embodiment, the algorithm is simplified by performing operations independently on each STFT time frame, without regard to past inputs. This eliminates the need for a "forgetting factor," which can cause problems with transients.

The methods of the various embodiments decompose a stereo signal by first extracting any information common to the left and right inputs and routing that to the center output; any residual audio energy may be routed to the left or right outputs as appropriate.

To facilitate this goal, it is assumed that inputs are created using the following signal model:

$$\vec{X}_L=\vec{\mathcal{L}}+\sqrt{0.5}\vec{\mathcal{C}} \quad (4)$$

$$\vec{X}_R=\vec{\mathcal{R}}+\sqrt{0.5}\vec{\mathcal{C}} \quad (5)$$

where the (known) input signals $\vec{X}_L$ and $\vec{X}_R$ are composed of an equal-power stereo mix of unknown left, right and center components $\vec{\mathcal{L}}$, $\vec{\mathcal{R}}$ and $\vec{\mathcal{C}}$, respectively. The outputs of the upmix algorithm will be the corresponding signal estimates: $\vec{L}$, $\vec{R}$ and $\vec{C}$.

It is assumed that components $\vec{\mathcal{L}}$, $\vec{\mathcal{R}}$ and $\vec{\mathcal{C}}$ are in turn made up of the following (sub-component) source signals, as shown in FIG. 1, which is a block diagram of a presumed signal model 100.

$$\vec{\mathcal{L}}=g_L\vec{\mathcal{P}}+\vec{\mathcal{A}}_L, \quad (6)$$

$$\vec{\mathcal{R}}=g_R\vec{\mathcal{P}}+\vec{\mathcal{A}}_R, \text{ and} \quad (7)$$

$$\vec{\mathcal{C}}=g_C\vec{\mathcal{P}}, \quad (8)$$

where $\vec{\mathcal{A}}_L$ and $\vec{\mathcal{A}}_R$ are the left and right ambient sources, and $\vec{\mathcal{P}}$ is a primary source that is pair-wise panned anywhere between left and center or between right and center (inclusive), using (time- and frequency-variant) gains $g_L$ 102, $g_R$ 104 and $g_c$ 106. (If desired, these gains can be regarded as transfer functions, to allow the possibility of decomposing convolutive mixes created using non-coincident microphone pairs or delay panning.)

In FIG. 1, a primary source P and ambient sources $\vec{\mathcal{A}}_L$ and $\vec{\mathcal{A}}_R$ are mixed using panning gains $g_L$ 102, $g_C$ 104 and $g_R$ 106. Also shown are unknown components $\vec{\mathcal{L}}$, $\vec{\mathcal{C}}$ and $\vec{\mathcal{R}}$, known input signals $\vec{X}_L$ and $\vec{X}_R$, and estimated (output) components L, C and R from upmix module 108. It is assumed that $$g_Lg_R=0 \quad (9)$$

Equations (6-9) clarify the following assumptions:

1) Each stereo pair of time/frequency input tiles $\vec{X}_L$ and $\vec{X}_R$ may contain only one significant primary source signal $\vec{\mathcal{P}}$. In practice, there may be some overlap of multiple primary sources, but this assumption has proven useful.

2) If primary source $\vec{\mathcal{P}}$ is panned somewhat left of center (i.e., between the left and center components $\vec{\mathcal{L}}$ and $\vec{\mathcal{C}}$), it will not be present in the right component $\vec{\mathcal{R}}$, and vice versa, since gains $g_L$ 102 and $g_R$ 104 cannot both be non-zero. To the extent that inputs $\vec{X}_L$ and $\vec{X}_R$ contain a common primary source, it should be regarded as coming from center component $\vec{\mathcal{C}}$ instead of from $\vec{\mathcal{L}}$ and $\vec{\mathcal{R}}$. This will provide a useful constraint.

3) It is assumed that ambient sources $\vec{\mathcal{A}}_L$ and $\vec{\mathcal{A}}_R$ are uncorrelated.

Decomposition Algorithm

Since the ambient sources are uncorrelated, and since components $\vec{\mathcal{L}}$ and $\vec{\mathcal{R}}$ do not contain a common primary source $\vec{\mathcal{P}}$, due to (9), the left and right components are uncorrelated and can be regarded as orthogonal.

Therefore $$\vec{\mathcal{L}}\cdot\vec{\mathcal{R}}=0. \quad (10)$$

From (4) and (5), we can rewrite (10) as $$(\vec{X}_L-\sqrt{0.5}\vec{\mathcal{C}})\cdot(\vec{X}_R-\sqrt{0.5}\vec{\mathcal{C}})=0, \quad (11)$$

which yields $$0.5\|\vec{\mathcal{C}}\|^2-\sqrt{0.5}\|\vec{\mathcal{C}}\|\|\vec{X}_L+\vec{X}_R\|\cos(\theta)+\vec{X}_L\cdot\vec{X}_R=0, \quad (12)$$

where θ is the angle between known $\vec{X}_L+\vec{X}_R$ and unknown $\vec{C}$.

In the absence of a better estimate, it may be reasonably assumed that θ≅0°; i.e., that the angle of center component $\vec{C}$ is roughly equal to that of the sum of the left and right input vectors:

$$\angle\vec{C}\approx\angle(\vec{X}_L+\vec{X}_R). \tag{13}$$

By adding equations (4) and (5), it is observed that as $\|\vec{L}+\vec{R}\|$ approaches zero, the angle of $\vec{X}_L+\vec{X}_R$ will approach that of $\vec{C}$, in which case the angle estimate of equation (13) will be accurate. On the other hand, the larger the magnitude of $\|\vec{L}+\vec{R}\|$ to the magnitude of $\vec{C}$, the more incorrect the center component angle estimate will be, but the less it will matter, because the magnitude of $\vec{C}$ will be comparatively small.

In practice, good results are achieved by setting angle θ to zero, which yields $$0.5\|\vec{C}\|^2-\sqrt{0.5}\|\vec{C}\|\|\vec{X}_L+\vec{X}_R\|+\vec{X}_L\cdot\vec{X}_R=0, \tag{14}$$

which is quadratic in $\|\vec{C}\|$. After using the quadratic formula, the following is obtained:

$$\|\vec{C}\|=\sqrt{0.5}\|\vec{X}_L+\vec{X}_R\|\pm\sqrt{0.5\|\vec{X}_L+\vec{X}_R\|^2-2\vec{X}_L\cdot\vec{X}_r}, \tag{15}$$

which simplifies to $$\|\vec{C}\|=\sqrt{0.5}(\|\vec{X}_L+\vec{X}_R\|\pm\|\vec{X}_L-\vec{X}_R\|). \tag{16}$$

The negative sign is selected to achieve the following minimum-energy center magnitude estimate:

$$\|\vec{C}\|=\sqrt{0.5}(\|\vec{X}_L+\vec{X}_R\|-\|\vec{X}_L-\vec{X}_R\|). \tag{17}$$

In an alternative embodiment, the center magnitude estimate can be smoothed over time by using a unity-normalized recursive cross-fade between the current center magnitude estimate and the prior smoothed center magnitude estimate:

$$\|\vec{C}\|_n=(1-\alpha)\|\vec{C}\|+\alpha\|\vec{C}\|_{n-1},$$

where $\|\vec{C}\|_n$ is the smoothed center magnitude estimate, $\|\vec{C}\|_{n-1}$ is the prior smoothed center magnitude estimate, and α is an exponential decay parameter that allows tuning of the smoothing time.

Since it has been assumed (equation 13) that the angle of center component $\vec{C}$ is approximately equal to that of the sum of the left and right input vectors, $\vec{C}$ may be estimated by taking a unit vector in the direction of $\vec{X}_L+\vec{X}_R$ and scaling it by the center magnitude estimate $\|\vec{C}\|$ from (17):

$$\vec{C}=\frac{(\vec{X}_L+\vec{X}_R)\|\vec{C}\|}{\|\vec{X}_L+\vec{X}_R\|+\varepsilon}, \tag{18}$$

where ε is a very small number intended to prevent division by zero.

Finally, from (4) and (5), estimated components $\vec{L}$ and $\vec{R}$ may be obtained:

$$\vec{L}=\vec{X}_L-\sqrt{0.5}\vec{C} \tag{19}$$

$$\vec{R}=\vec{X}_R-\sqrt{0.5}\vec{C} \tag{20}$$

Figure 2:
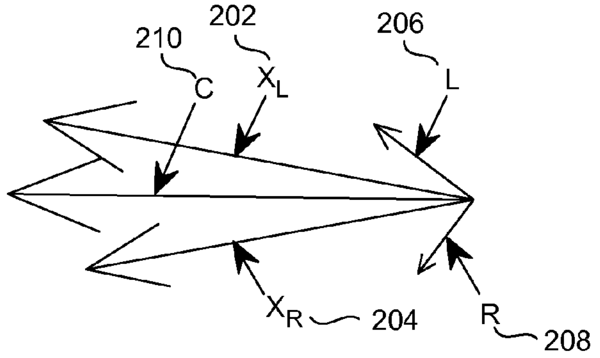
FIG. 2 shows a typical set of input and output vectors.

FIG. 2 shows a typical set of left and right input vectors 202 and 204 ($\vec{X}_L$ and $\vec{X}_R$) and left, right and center output vectors 206, 208, and 210 ($\vec{L}$, $\vec{R}$ and $\vec{C}$). In this example, the similarity in angle and magnitude between inputs $\vec{X}_L$ 202 and $\vec{X}_R$ 204 results in a strong center output $\vec{C}$ 210. Note that estimated left and right components $\vec{L}$ 206 and $\vec{R}$ 208 are orthogonal by construction, as given in equation (10).

Geometric Interpretations

In equation (17), the estimated magnitude of center component $\vec{C}$ equals $\sqrt{0.5}$ times the difference between the magnitude of the sum of the left and right input vectors and the magnitude of their difference. This equation has a geometric interpretation as shown below.

Figure 3:
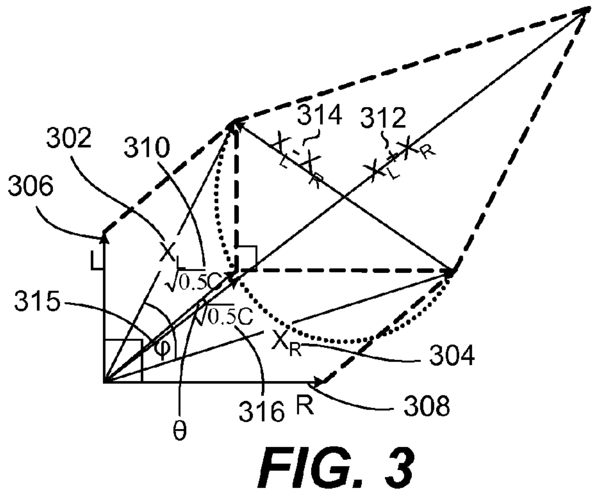
FIG. 3 shows a geometric interpretation of the vector decomposition.

FIG. 3 shows a geometric interpretation of the vector decomposition in accordance with one embodiment. It depicts left and right inputs $\vec{X}_L$ 302 and $\vec{X}_R$ 304, components $\vec{L}$ 306, $\vec{R}$ 308 and $\sqrt{0.5}\vec{C}$ 310, diagonal sum vector $\vec{X}_L+\vec{X}_R$ 312, diagonal difference vector $\vec{X}_L-\vec{X}_R$ 314, and center output $\sqrt{0.5}\vec{C}$ 316.

FIG. 3 shows that left input $\vec{X}_L$ is a diagonal of a parallelogram that has components $\vec{L}$ and $\sqrt{0.5}\vec{C}$ as two of its sides. In other words, $\vec{X}_L$ is composed of L+$\sqrt{0.5}\vec{C}$, and similarly for the right channel, as given in (4) and (5). It may also be observed that $\vec{X}_L+\vec{X}_R$ 312 and $\vec{X}_L-\vec{X}_R$ 314 are the diagonals of a parallelogram having two sides of length $\|\vec{X}_L\|$ two sides of length $\|\vec{X}_R\|$. Furthermore, at least in this case, the angle of center component $\vec{C}$ is similar but not identical to that of $\vec{X}_L+\vec{X}_R$ 312.

The dashed lines connecting $\sqrt{0.5}\vec{C}$ to $\vec{X}_L$ and $\vec{X}_L$ are orthogonal, since they are constructed to be parallel to orthogonal components $\vec{L}$ and $\vec{R}$, respectively. Together with the diagonal vector $\vec{X}_L-\vec{X}_R$ 314, these two lines form a right triangle. By the Pythagorean theorem, $$\|\vec{X}_L-\sqrt{0.5}\vec{C}\|^2+\|\vec{X}_R-\sqrt{0.5}\vec{C}\|^2=\|\vec{X}_L-\vec{X}_R\|^2 \tag{21}$$

This simplifies to equation (11) and merely reiterates that the dashed lines in FIG. 3 connecting $\sqrt{0.5}\vec{C}$ to $\vec{X}_L$ and $\vec{X}_R$ are orthogonal.

From the law of cosines, $\sqrt{0.5}\vec{C}$ is constrained to be at some point along a semicircle (shown as a dotted line) of diameter $0.5\|\vec{X}_L-\vec{X}_R\|$, centered around $0.5(\vec{X}_L+\vec{X}_R)$, at the intersection of the sum and difference vectors. Therefore, $\sqrt{0.5}\vec{C}$ can be visualized geometrically according to $$\sqrt{0.5}\|\vec{C}\|=0.5\|\vec{X}_L+\vec{X}_R\|-0.5\|\vec{X}_L-\vec{X}_L\| \tag{22}$$

(from (17)), by applying this magnitude to the direction of the sum vector. The sum vector intersects the dotted semicircle at $\sqrt{0.5}\vec{C}$.

Geometric Interpretations of Phase and Magnitude Differences: Phase Differences The phase difference ϕ 315 between $\vec{X}_L$ 302 and $\vec{X}_L$ 304 is a useful indicator of how much primary content the left and right inputs may have in common. The smaller the value of ϕ

315, the more likely that both inputs contain significant amounts of the same primary source $\vec{P}$.

Figure 4A:
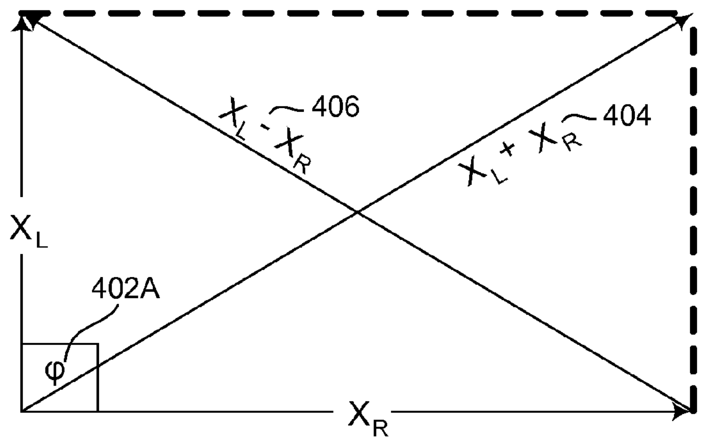
FIGS. 4*a*, 4*b*, and 4*c* are illustrations showing how the phase difference $\phi$ relates to the difference between the magnitudes of diagonals $\vec{X}_L+\vec{X}_R$ and $\vec{X}_L-\vec{X}_R$.
Figure 4B:
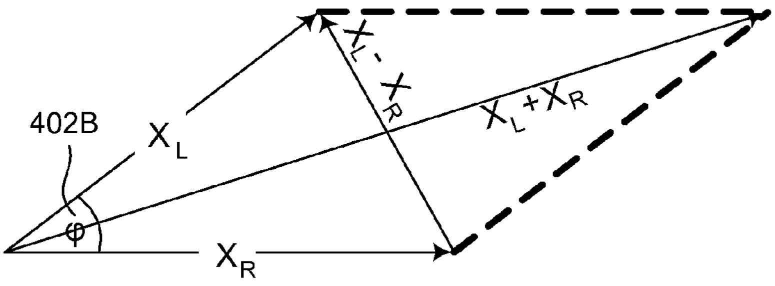
Figure 4C:
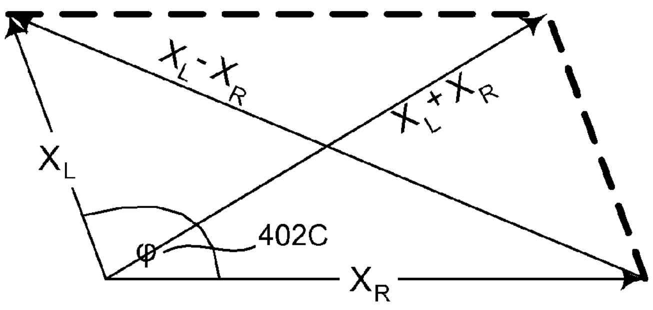

FIGS. 4A, 4B, and 4C are illustrations showing how the phase difference $\phi$ (402A, 402B, and 402C) relates to the difference between the magnitudes of diagonals $\vec{X}_L+\vec{X}_R$ 404 and $\vec{X}_L-\vec{X}_R$ 406 in (17). Comparing FIGS. 4A through 4C, it may be observed that as $\phi$ becomes smaller, the length of sum diagonal $\vec{X}_L+\vec{X}_R$ 404 increases in relation to that of difference diagonal $\vec{X}_L-\vec{X}_R$ 406.

In FIG. 4B, where $\phi<90°$, the sum diagonal is larger than the difference diagonal, causing $\|\vec{C}\|$ to approach $\sqrt{2}$ times the minimum of $\|\vec{X}_L\|$ and $\|\vec{X}_R\|$ in equation (17) as $\phi$ 402B approaches 0°. If the left and right inputs are identical, angle $\phi$ 402B will equal 0° and $\|\vec{C}\|$ will equal $\sqrt{0.5}\|\vec{X}_L+\vec{X}_R\|=\sqrt{X}\|\vec{X}_L\|=\sqrt{2}\|\vec{X}_R\|$. In this case, all of the input energy will be allocated to center output $\vec{C}$, as desired.

In FIG. 4A, where $\phi=90°$, the two diagonals of the parallelogram ($\vec{X}_L+\vec{X}_R$ 404 and $\vec{X}_L-\vec{X}_R$ 406) are of equal length, regardless of the relative levels of the left and right inputs. As a result, the magnitude of center output $\vec{C}$ will be zero (17). Therefore, if the input signals are uncorrelated, all of their energy will be sent to left and right outputs $\vec{L}$ and $\vec{R}$, and none to center output $\vec{C}$.

In FIG. 4C, where $\phi>90°$, the sum diagonal is smaller than the difference diagonal, causing $\|\vec{C}\|$ to approach $-\sqrt{2}$ times the minimum of $\|\vec{X}_L\|$ and $\|\vec{X}_R\|$ as $\phi$ 402C approaches 180°. In other words, when inputs $\vec{X}_L$ and $\vec{X}_R$ are largely out of phase, the magnitude of center output $\vec{C}$ in (17) becomes negative.

One option for dealing with this possibility is simply to keep the negative value of $\|\vec{C}\|$, despite the non-physical idea of a negative length. This will reverse the direction of the $\vec{C}$ vector in (18), which may cause a slight amount of energy gain (since the output vectors will be pointing in opposing directions) and create unwanted crosstalk from anti-phase left and right components into the center output. Other options are to set $\|\vec{C}\|$ to 0 whenever the estimated magnitude is negative, or to attenuate it by some arbitrary factor. These options can reduce the crosstalk but may cause "musical noise" artifacts. In practice, keeping the negative value of $\|\vec{C}\|$ seems to be the best option.

Figure 5:
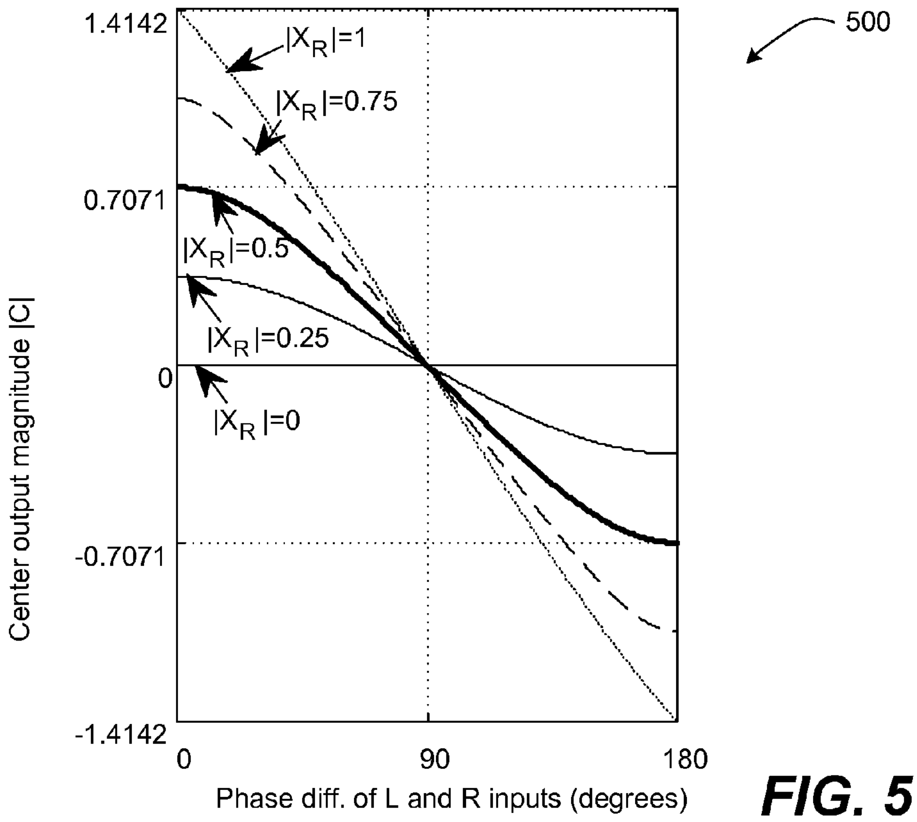
FIG. 5 is a graph showing magnitude $\|\vec{C}\|$ of the center output for various input phase differences $\phi$ and right input magnitudes $\|\vec{X}_R\|$, given $\|\vec{X}_L\|=1$.

Geometric Interpretations of Phase and Magnitude Differences: Magnitude Differences FIG. 5 is a graph 500 showing magnitude $\|\vec{C}\|$ of the center output for various input phase differences and right input magnitudes $\|\vec{X}_R\|$, given $\|\vec{X}_L\|=1$. Graph 500 shows the effect of input phase and magnitude differences on the magnitude of the center output $\vec{C}$. The variable $\phi$ is the phase difference between inputs $\vec{X}_L$ and $\vec{X}_R$.

The magnitude of the center output is partly a function of how much magnitude the two inputs have in common; according to (17), the center magnitude can be no more than $(\pm)\sqrt{2}$ times the length of the smaller of the two input vectors.

If one of the inputs, such as $\vec{X}_R$, equals zero in (17), the magnitude of $\vec{C}$ will equal 0; since there is no right channel input energy, all of the left input energy will be applied to the left output and none to the center. Note that this would not have been the case if the plus sign had been selected for the ± in equation (16).

When the left and right input magnitudes are identical (e.g., $\|\vec{X}_L\|=\|\vec{X}_R=1$ in FIG. 5), the magnitude of center output $\vec{C}$ varies almost linearly with the input phase difference $\phi$, reaching a maximum when the input phases are equal.

Improving the Center Selectivity

For the purpose of enhancing dialogue clarity, the center output will be reserved mostly for primary sources that were panned directly to the center.

The described embodiment is reasonably effective at keeping the center output free of sources that were hard-panned toward the left or right. However, when primary sources such as music or sound effects are panned off-center (e.g., somewhere between left and center), a significant amount of off-center content may end up in the center output channel. This result is correct according to the original signal model, which required that any common portion of the left and right inputs should be sent to the center output. However, this behavior may cause off-center music and sound effects to mask or compete with any dialogue that may be present.

Center channel separation can be improved by using various heuristic methods.

Geometric Mean Method

In one embodiment, a method extends the previous decomposition by redirecting off-center sounds away from the center output, toward the side outputs. To begin, magnitudes of the sum and difference of the left and right inputs are referred to as $\zeta$ and $\delta$, respectively:

$$\zeta=\|\vec{X}_L+\vec{X}_R\|$$

$$\delta=\|\vec{X}_L-\vec{X}_R\| \tag{23}$$

(where $\delta$ is not to be confused with the "delta function").

Recall from (17) that the estimate of the center channel's magnitude is proportional to the difference between the magnitude of the sum of the left and right inputs and the magnitude of their difference, as follows:

$$\|\vec{C}\|=\sqrt{0.5}(\zeta-\delta). \tag{24}$$

If a controlled way to increase the value of $\delta$ can be identified, making it closer to the value of $\zeta$ (assuming the magnitude of the difference is less than that of the sum), this will reduce the estimated center channel magnitude for off-center sounds, causing more of the energy to be panned toward the left and right outputs instead.

First, $\delta$ is divided by $\zeta$, so that the resulting normalized difference magnitude, $\delta_1$, will usually be less than 1.0 when primary sources are present:

$$\delta_1=\frac{\delta}{\zeta}. \tag{25}$$

Next, the square root of the normalized difference magnitude is taken:

$$\delta_2=\sqrt{\delta_1}. \tag{26}$$

The purpose of the square root operation is to move the value closer to 1.0, increasing the difference magnitude in the usual case in which $\delta$ was less than $\zeta$.

Finally, the normalization from (25) is reversed by multiplying by the sum magnitude:

$$\hat{\delta}=\delta_2\zeta. \tag{27}$$

Combining (25-27) results in $$\hat{\delta}=\zeta\sqrt{\frac{\delta}{\zeta}}, \quad \text{or, simplifying} \tag{28}$$

$$\hat{\delta}=\sqrt{\delta\zeta}. \tag{29}$$

Thus, the modified difference magnitude $\hat{\delta}$ is the geometric mean of the magnitudes of the actual difference and sum, which moves the difference magnitude halfway (in a geometric sense) toward the sum magnitude. Substituting this for $\delta$ in (24) yields $$\|\vec{C}\|=\sqrt{0.5(\zeta-\sqrt{\delta\zeta})}. \tag{30}$$

This new center magnitude estimate preserves some desired characteristics of (24). First, as $\delta$ approaches zero, the center magnitude approaches $\sqrt{0.5}\zeta$; thus, when the left and right inputs are identical, the output will be sent only to the center channel. Second, as $\delta$ approaches $\zeta$, the center magnitude approaches zero; this ensures that orthogonal inputs will be panned only to the left and right outputs.

However, when $0<\delta<\zeta$ (the usual case for a primary source panned off-center), equation (30) will reduce the estimated center magnitude, sending more of the off-center energy toward the left and right outputs. This may make it easier to isolate the center channel so the gain of the center-panned dialogue can be increased relative to that of any off-center music and sound effects.

Figure 6:
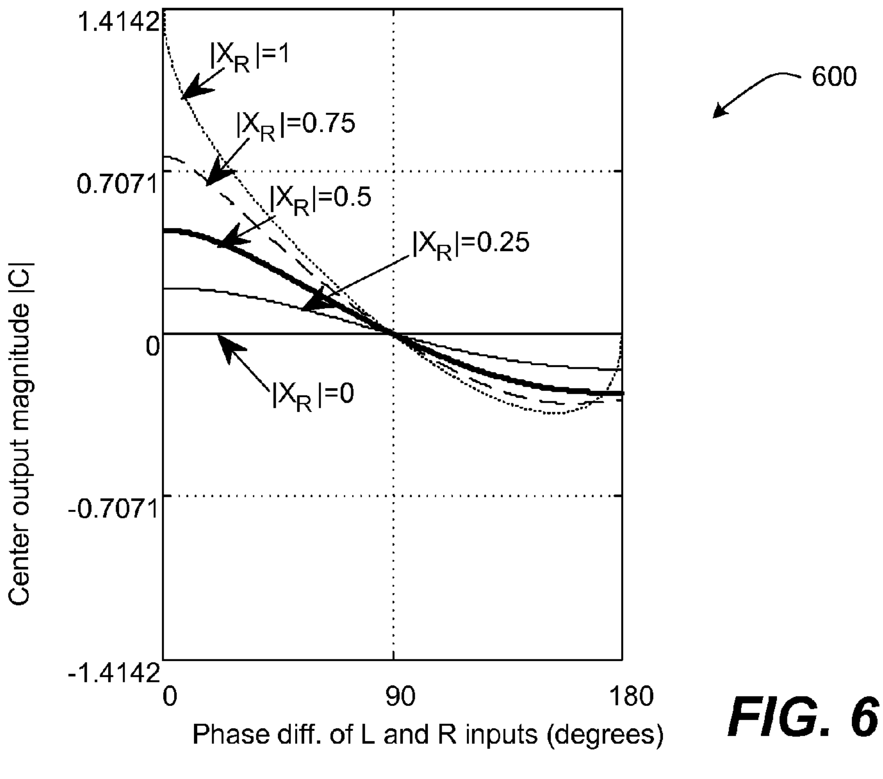
FIG. 6 shows magnitude $\|\vec{C}\|$ of the center output for various input phase differences $\phi$ and right input magnitudes $\|\vec{X}_R\|$, for the geometric mean method, given $\|\vec{X}_L\|=1$.

FIG. 6 is a graph 600 showing the magnitude $\|\vec{C}\|$ of the center output for various input phase differences $\phi$ and right input magnitudes $\|\vec{X}_R\|$, for the "geometric mean" embodiment, when the left input $\vec{X}_L$ has unity magnitude. Comparing graph 600 to graph 500 in (FIG. 5), it may be observed that when the input phase difference $\phi$ is zero (suggesting that the inputs have a common primary source), the center output magnitude is attenuated as the input magnitudes become more dissimilar. In other words, off-center sources will be panned less to the center output and more to the left and right sides, as desired.

Recall from (24) that when the magnitude of the difference of the inputs was greater than the magnitude of their sum ($\delta>\zeta$), the resulting center magnitude estimate was negative. Graph 600 of FIG. 6 shows that with the geometric mean embodiment, anti-phase inputs (identical magnitudes and 180° phase difference) result in a center output magnitude of zero, instead of a negative value; this is because $\zeta$ becomes zero in equation (30). Other magnitude and phase differences can still result in negative center magnitude estimates, but the negative center outputs are attenuated compared to those in the original embodiment (shown in FIG. 5).

Graph 600 reveals that when the input magnitudes are the same ($\|X_L\|=\|X_R\|=1$), the center output magnitude drops off much more rapidly with increases in the input phase difference $\phi$ than was the case in graph 500. This could help keep unwanted ambient sources (having similar magnitudes and dissimilar phases) out of the center output channel.

For certain types of source signals (such as wide-band wind or water sounds), the geometric mean method can result in slight "musical noise" artifacts. If desired, unwanted effects can be minimized by replacing (29) with the following equation:

$$\hat{\delta}=\sqrt{\delta((1-k)\delta+k\zeta)}, \tag{31}$$

where k is a parameter between zero and one, inclusive. The k parameter controls the extent to which the geometric mean method is applied. When k=0, $\hat{\delta}=\delta$, yielding the original method; when k=1, $\hat{\delta}=\sqrt{\delta\zeta}$, as in (29), applying the full geometric mean method. When 0<k<1, an intermediate amount of modification is applied, providing a way to achieve additional center channel selectivity without obvious artifacts. Substituting (31) for $\delta$ in (24) yields $$\|\vec{C}\|=\sqrt{0.5(\zeta-\sqrt{\delta((1-k)\delta+k\zeta)})}. \tag{32}$$

The geometric mean embodiment improves the isolation of the center channel, though it violates the original assumption that any signal common to the left and right inputs should be panned to the center. As a result, the left and right outputs, $\vec{L}$ and $\vec{R}$, will no longer be orthogonal after performing this modification.

Magnitude Similarity Method

In another embodiment, a method for upmixing based on magnitude similarity improves the center selectivity by panning off-center content toward the side speakers, as follows:

$$m=\frac{\min(\|\vec{X}_L\|,\|\vec{X}_R\|)}{\max(\|\vec{X}_L\|,\|\vec{X}_R\|,\varepsilon)}, \quad \text{and} \tag{33}$$

$$\|\vec{C}\|=m\|\vec{C}\|, \tag{34}$$

where m is a measure of similarity between the magnitudes of the left and right inputs. Equation (33) is equivalent to the following equation, $$m=1-\frac{\|\,\|\vec{X}_L\|,\|\vec{X}_R\|\,\|}{\max(\|\vec{X}_L\|,\|\vec{X}_R\|,\varepsilon)}, \tag{35}$$

except in the case where both input magnitudes are zero (in which case the value of m is irrelevant). In either (33) or (35), m equals one when the inputs have identical non-zero magnitudes (i.e., maximum magnitude similarity); m equals zero if exactly one of the inputs has zero magnitude; and 0<m<1 when the input magnitudes are non-zero and non-identical.

Figure 7:
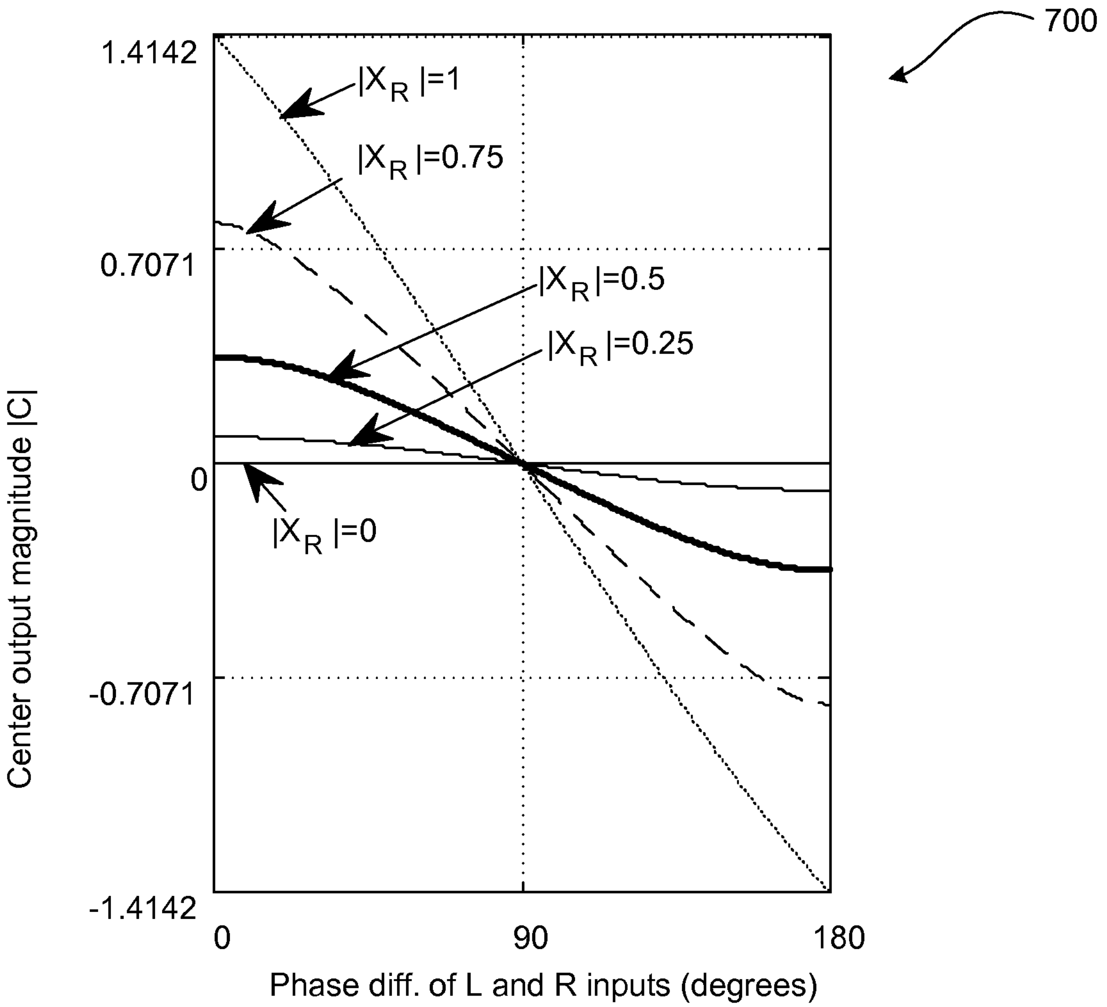
FIG. 7 is a graph showing magnitude $\|\vec{C}\|$ of the center output for various input phase differences $\phi$ and right input magnitudes $\|\vec{X}_R\|$, for the magnitude similarity method, given $\|\vec{X}_L\|=1$.

FIG. 7 is a graph 700 showing magnitude $\|\vec{C}\|$ of the center output for various input phase differences $\phi$ and right input magnitudes $\|\vec{X}_R\|$, for the magnitude similarity embodiment, given $\|X_L\|=1$. A comparison of graph 700 to graph 500 shows that the magnitude similarity embodiment attenuates the center output magnitude as the input magnitudes become more dissimilar.

In order to limit the well-known "musical noise" artifact, it can be useful to limit m to a range such as [0.1, 0.9]. Additional center channel selectivity may be achieved by raising m to a power greater than one, such as 2.0; reduced selectivity (and presumably reduced artifacts) can be achieved by raising m to a power less than one.

In one embodiment, the magnitude similarity m may be smoothed as follows, $$\hat{m} = \sin\left(\frac{\pi}{2}m\right), \tag{36}$$

to remove slope discontinuities from the similarity function.

Channel Separation

Figure 8:
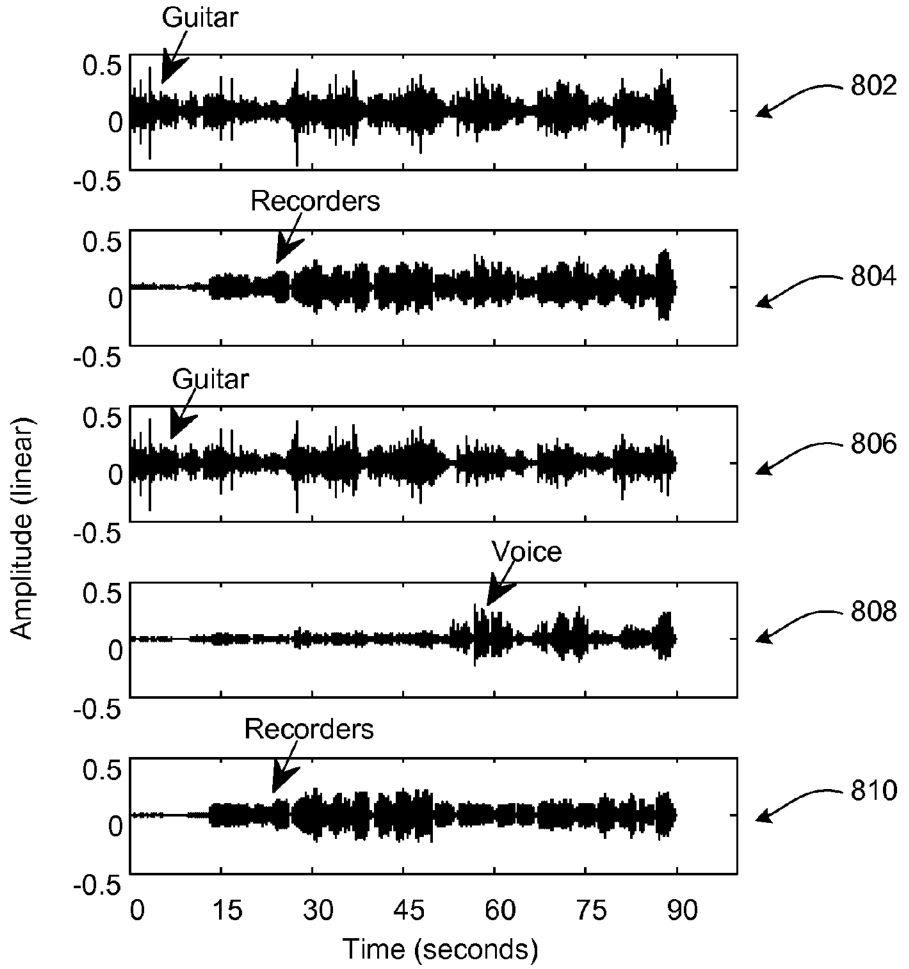
FIG. 8A to 8E illustrate channel separation in accordance with one embodiment.

FIG. 8 illustrates channel separation using the first 90 seconds of the song "Stairway to Heaven." The horizontal axis shows time and the vertical axis shows amplitude. Graph 802 shows the left input (guitar and voice) and graph 804 shows the right input (recorders and voice). Graph 806 shows the left output (guitar), graph 808 shows the center output (voice), and graph 810 shows the right output (recorders).

It may be observed that very little of the acoustic guitar input is present in the center and right output channels shown in graphs 808 and 810. The center output shown in graph 808 has some reverberation and/or crosstalk, but the onset of the voice is much more apparent than would be seen, for example, by summing the left and right inputs shown in graphs 802 and 804.

Power Gain of Sources Panned in Various Directions

Figure 9:
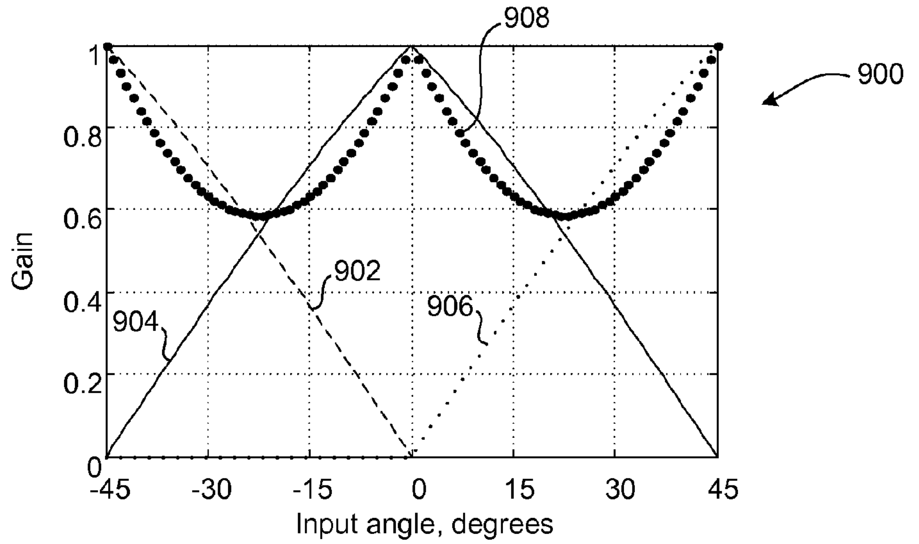
FIG. 9 is a graph showing left output gain (light dashed line); center output gain (solid line); right output gain (dotted line); and power gain (heavy dotted line)

FIG. 9 is a graph 900 showing the left output gain 902 (light dashed line); center output gain 904 (solid line); right output gain 906 (dotted line); and power gain 908 (heavy dotted line). The vertical axis is gain and the horizontal axis is input angle (degrees). The heavy dotted line 908 shows that a preferred embodiment has unity power gain for inputs panned to hard-left, hard-right, and center. (This would not have been true if other constants had been used instead of $\sqrt{0.5}$ in (4) and (5).) However, this embodiment is not energy preserving, because it has approximately 2.3 dB of power loss around ±23°.

Figure 10:
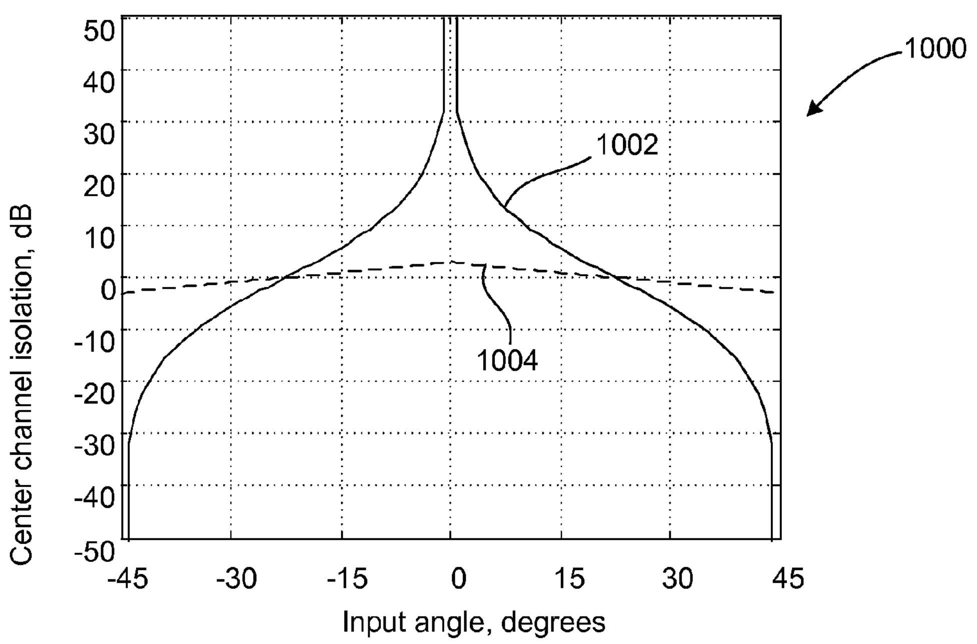
FIG. 10 shows center channel isolation for the current upmix method.

FIG. 10 is a graph 1000 showing the center channel isolation (defined here as ||C||/max(||L||, ||R||, eps), expressed in dB) for the current upmix method (solid line 1002) and for a typical time-domain matrix upmix (dashed line 1004), as a function of the panning angle. As mentioned previously, time-domain matrix upmix methods typically have only 3 dB of separation between, for example, the left and center output channels. With the current upmix method, a signal panned to hard left has no center output gain, and a signal panned to the center has no left or right output gain. Therefore, the channel separation is infinite (assuming no inter-source interference or reverberation) for sources panned to hard left, hard right or center.

Energy Normalization

Power complementarity is considered a desirable property because it guarantees a flat total radiated power response. In one embodiment, energy may be preserved or normalized (e.g., for center channel derivation without speech enhancement), by normalizing each output time-frequency tile by the quotient, q, of the corresponding input and output energies, as follows:

$$q = \frac{\sqrt{\vec{X}_L^H\vec{X}_L + \vec{X}_R^H\vec{X}_R}}{\sqrt{L^HL + R^HR + C^HC + \varepsilon}}, \tag{37}$$

$$\vec{L} = q\vec{L}, \tag{38}$$

$$\vec{R} = q\vec{R}, \text{ and} \tag{39}$$

$$\vec{C} = q\vec{C}. \tag{40}$$

This normalization will not affect the perceived panning directions, because the same gain is applied to each component.

Apparent Source Directions

It is desirable to preserve the perceived source directions and width of the original signal. The overall perceived width is partly a function of the apparent position of each panned source, and partly a function of the overall center vs. side channel energies, as described below.

If a primary input source is panned in various directions and upmixed to three channels, one embodiment preserves the apparent source direction of the original two-channel mix according to the tangent law.

This can be shown as follows, assuming that the center speaker is positioned at 90° (directly in front) and the left and right speakers are positioned at 45° to either side. First, unit vectors in the left, right and center speaker directions are defined, as follows $$U_L = \sqrt{0.5}(-1+i)$$

$$U_R = \sqrt{0.5}(1+i)$$

$$U_C = i, \tag{41}$$

where $i=\sqrt{-1}$. Next, the magnitudes of the left, right and center output signals are applied to the corresponding speaker direction unit vectors, and the sum, S, of the resulting speaker vectors is taken:

$$S = \|\vec{L}\|U_L + \|\vec{R}\|U_R + \|\vec{C}\|U_C. \tag{42}$$

Assuming the original input and output vectors all have the same phase, i.e., $$\angle\vec{L} = \angle\vec{R} = \angle\vec{C} = \angle\vec{X}_L = \angle\vec{X}_R, \tag{43}$$

since only a single primary source is involved, equations (19), (20), (24) and (42) can be combined as follows:

$$S = (\|\vec{X}_L\| - 0.5(\zeta-\delta))U_L + (\|\vec{X}_R\| - 0.5(\zeta-\delta))U_R + \sqrt{0.5}(\zeta-\delta)U_C, \tag{44}$$

This simplifies to $$S = \|\vec{X}_L\|U_L + \|\vec{X}_R\|U_R. \tag{45}$$

Taking the angle of both sides provides $$\angle S = \angle(\|\vec{X}_L\|U_L + \|\vec{X}_R\|U_R). \tag{46}$$

Therefore, the apparent angle of the sum of the left, right and center speaker vectors equals the apparent angle of the left and right input signals, applied to speakers at 90°±45°. (These speaker vectors should not be confused with the input and output signal vectors, where the angles corresponded to phase angles, not speaker directions.)

Figure 11:
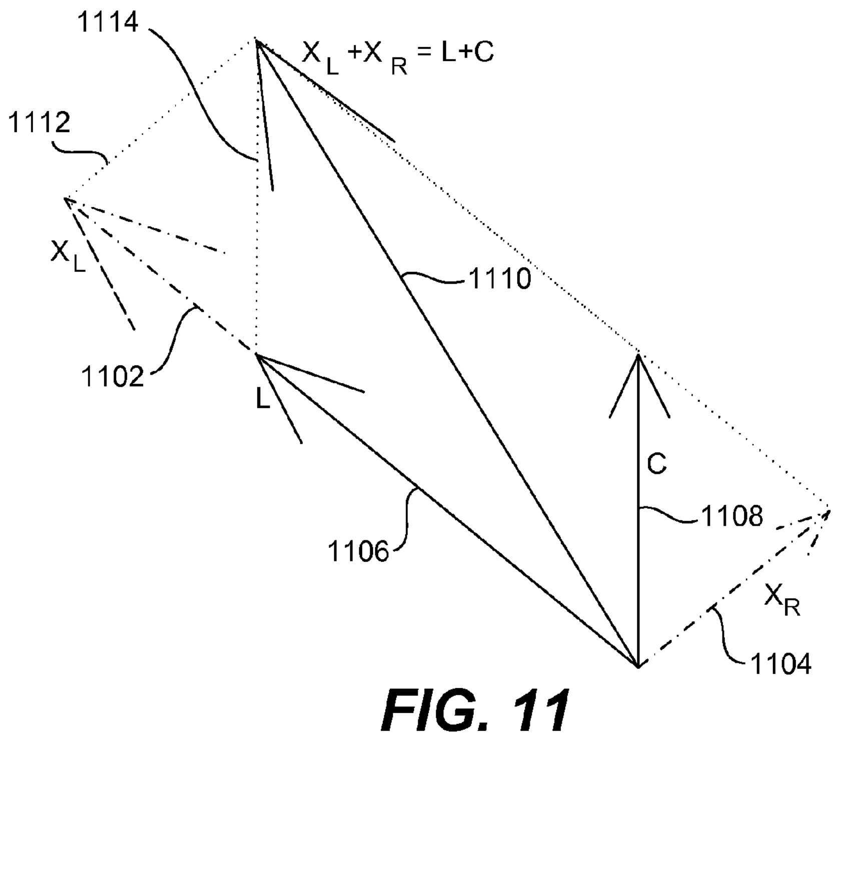
FIG. 11 is an illustration showing preservation of apparent source direction.

FIG. 11 demonstrates that the vector sum of left and right inputs having magnitudes $\|\vec{X}_L\|$ and $\|\vec{X}_R\|$ and directions 135° and 45° equals the vector sum of left and center outputs having magnitudes $\|\vec{L}\|$ and $\|\vec{C}\|$ and directions 135° and 90° respectively. (The right output $\vec{R}$ equals zero since any energy common to $\vec{X}_L$ and $\vec{X}_R$ ends up in $\vec{C}$.)

The figure is an illustration showing preservation of apparent source direction. The example in FIG. 11 shows inputs $X_L=3(\sqrt{0.5}(-1+i))$ and $X_R=1(\sqrt{0.5}(1+i)$ (dash-dotted arrows 1102 and 1104) and outputs $L=2(\sqrt{0.5}(-1+i))$ and $C=2i\sqrt{0.5}$ (solid arrows 1106 and 1108). The sum of the inputs, $X_L+X_R$, equals the sum of the outputs, $\overrightarrow{L+C=2\sqrt{0.5}}(-1+2i)$ (solid arrow 1110). Dotted lines 1112 and 1114 indicate the vector addition.

Thus, this method preserves the apparent position of each amplitude-panned source. (This would not have been the case if the algorithm had been derived from a signal model that used other constants, such as 0.5 or 1.0, instead of $\sqrt{0.5}$ in equations (4) and (5).)

The modified versions of the algorithm, using the geometric mean, magnitude similarity and energy normalization methods, are also direction-preserving.

Using 2-to-3 Channel Upmix for Voice Enhancement

As mentioned, in movies and related content, the dialogue is usually panned to the center. Once the two- to three-channel upmix has been performed, it is possible to enhance the voice by applying an amplitude gain to the extracted center channel (after deriving L and P).

Dialogue intelligibility can also be enhanced by performing filtering to pass the voice frequencies (approximately 100-8000 Hz) in the center channel and attenuate other frequencies. The filtering can be applied to the time-domain output, but it may be more efficient to apply the filtering directly in the STFT domain, taking care to minimize any time aliasing by smoothing the gain changes from one subband to the next.

For example, for STFT bins below a low voice cutoff frequency $f_L$ (e.g., 150 Hz), a frequency-dependent gain $g_v(b)$ can be applied as follows:

$$g_v(b) = 10^{\frac{G(b)}{20}}, \text{ where} \tag{47}$$

$$G(b) = \frac{s_v \log\left(\frac{f(b)}{f_L}\right)}{\log(2)}, \text{ and} \tag{48}$$

$$f(b) = \frac{b f_s}{N}, \tag{49}$$

where b is the bin index for bins below low cutoff bin $b_L=\text{floor}(f_L N/f_S)$, G(b) is the gain of bin b expressed in dB, N is the FFT size, $f_S$ is the sampling rate in Hz, and $s_v$ is the desired filter rolloff (e.g., 12 dB/octave). (The equations will be similar for rolloffs above a high cutoff frequency, but with a negative value of $s_v$.)

Instead of simply attenuating any non-voice frequencies in the center channel, it is possible to redirect those frequencies to the side channels by applying the gains $g_v$ to the center magnitude estimate $\|\vec{C}\|$:

$$\|\vec{C}[b,l]\| = g_v(b)\|\vec{C}[b,l]\|. \tag{40}$$

The reduction in center channel gain at the non-voice frequencies will result in an increase in left and right output gains at those frequencies due to equations (19-20). After the left and right output signals are derived, the center channel output can be amplified if desired, to reduce masking of the voice by left and right outputs in the vocal frequency range. A variety of advanced speech detection and enhancement methods can also be applied to the derived center channel.

Obtaining Additional Front Outputs

For multi-speaker systems such as television "soundbars," it may be useful to derive five or more front channels from a two-channel input. Additional front channels can be extracted by performing the algorithm repeatedly on adjacent pairs of output signals.

Figure 12:
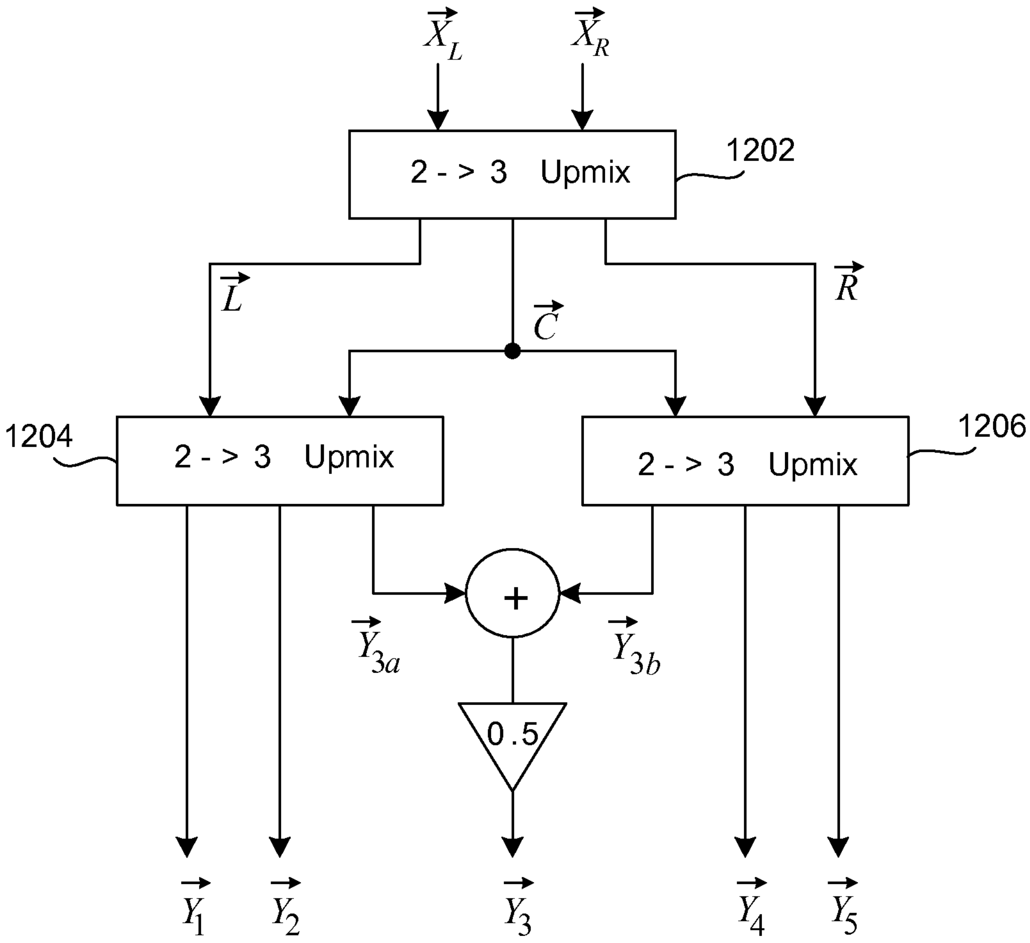
FIG. 12 is a block diagram showing components for upmixing from two channels to five front channels using three two-to-three upmix components.

It will be assumed that any signal common to two speakers may be sent to the new, in-between speaker. In one embodiment, an upmix from two to five front channels may be performed as shown in FIG. 12 which shows a two- to five-channel upmix comprising three two- to three-channel upmixes 1202, 1204, and 1206.

Figure 13:
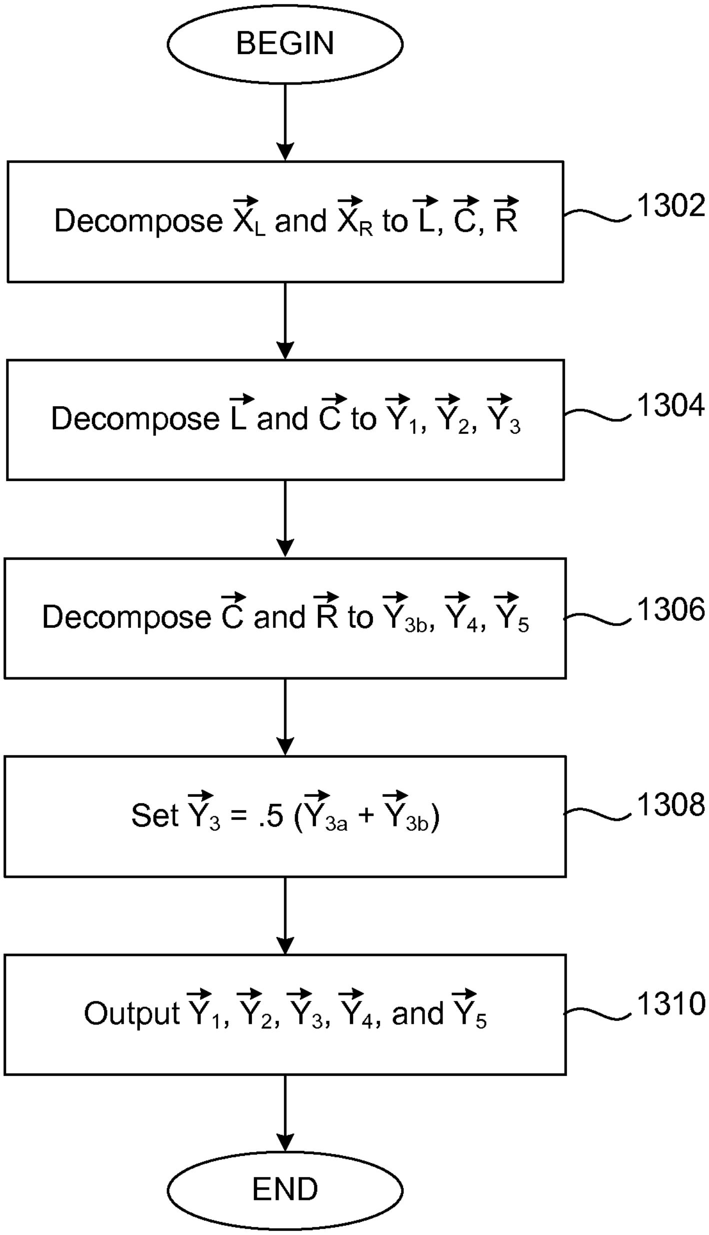
FIG. 13 is a flow diagram of a process of upmixing from two channels to five front channels in accordance with one embodiment.

FIG. 13 is a flow diagram of a process of obtaining additional front outputs in accordance with one embodiment. At step 1302 inputs $\vec{X}_L$ and $\vec{X}_R$ are decomposed into outputs $\vec{L}$, $\vec{C}$ and $\vec{R}$ using equations (17-20) in upmix component 1202. At step 1304 outputs $\vec{L}$ and $\vec{C}$ are treated as inputs $\vec{X}_L$ and $\vec{X}_R$, and decomposed into ("left," "center," and "right") outputs $\vec{Y}_1$, $\vec{Y}_2$ and $\vec{Y}_3$, using (17-20) in upmix component 1204. At step 1306 outputs $\vec{C}$ and $\vec{R}$ (from step 1302) are treated as inputs $\vec{X}_L$ and $\vec{X}_R$ and decomposed into ("left," "center," and "right") outputs $\vec{3}_{3b}$, $\vec{Y}_4$ and $\vec{Y}_5$ using (17-20) in upmix component 1206. At step 1308, $\vec{Y}_3$ is set as: $\vec{Y}_3=0.5(\vec{Y}_{3a}+\vec{Y}_{3b})$. At step 1310, the resulting five-channel signal is outputted. The resulting outputs, from left to right, are $\vec{Y}_1$, $\vec{Y}_2$, $\vec{Y}_3$, $\vec{Y}_4$, and $\vec{Y}_5$ (left, left-center, center, right-center, and right) as shown in FIG. 12.

A playback system with multiple front speakers, such as a soundbar, may suffer from comb filtering or phase cancellation issues. The above embodiment minimizes this problem because most of the inter-speaker correlation involves speakers that are immediately adjacent; since the adjacent speakers are relatively close together, any phase cancellations are likely to be in the mid- to high-frequency range. Known decorrelation methods may be used to address these phase cancellations.

Ambience Extraction

In typical stereo recordings, the left and right channels usually have similar ambience levels. The previously described embodiments do not explicitly extract the ambience or require the left and right channels to have equal ambience levels. However, by selecting the angle of estimated center component $\vec{C}$ to equal that of the sum of the left and right input vectors (13), the described embodiment avoids grossly unequal ambience levels.

After two- to three-channel upmix is performed, any ambience will be contained primarily in the left and right output channels, since the center output consists mostly of signals that were common between the left and right inputs. If desired, left and right ambience (surround) channels may be extracted from the left and right outputs.

To the extent that a given pair of left and right output vectors has similar magnitudes, the vectors probably consist mostly of ambience, since a primary source present in both the left and right inputs would have been sent to the center output instead. Therefore, left and right surround signals may be extracted from the left and right outputs using a magnitude similarity measure, as follows:

$$m = \frac{\min(\|\vec{L}\|, \|\vec{R}\|)}{\max(\|\vec{L}\|, \|\vec{R}\|, \varepsilon)}, \tag{51}$$

$$\vec{L} = m\vec{L}, \tag{52}$$

$$\vec{R}_S = m\vec{R}, \tag{53}$$

where m is a measure of similarity between the magnitudes of the left and right outputs, and $L_S$ and $R_S$ are the left and right surround outputs, respectively. It may be noted that m in (50) is based on the magnitudes of the left and right output vectors, unlike the magnitude similarity function in (33), which was based on the magnitudes of the left and right input vectors. After extracting the left and right surround channels, they are subtracted from the left and right outputs, respectively, to get the final left and right output signals:

$$\vec{L} = \vec{L} - \vec{L}_S, \quad \text{and} \tag{54}$$

$$\vec{R} = \vec{R} - \vec{R}_S. \tag{55}$$

As before, a sine function can be used to remove slope discontinuities from the magnitude similarity function:

$$\hat{m} = \sin\left(\frac{\pi}{2} m\right). \tag{56}$$

As the difference between the left and right output magnitudes approaches zero, m will approach one, signifying that the left and right output channels consist primarily of ambience; as a result, a portion of the left and right outputs will be redirected to the corresponding surround channels. If the left and right output magnitudes are very different (e.g., if one of them is zero), m will approach zero, and none of the left and right output energy will be redirected to the surround channels.

A common usage scenario may be to upmix to three channels, boost or filter the center channel for speech enhancement, and downmix back to two channels for systems having two loudspeakers. It is desirable that, in the absence of center channel speech enhancement, the resulting downmix should sound similar to the original signal.

When mixed back to two channels using an equal-power mixing matrix, the result sounds virtually identical to the input signal. If energy normalization is used (as described above), the result preserves the apparent width of the input signal as well as the relative energies of sources panned to different directions.

The downmix to two channels can be done in the frequency domain, eliminating the need to perform inverse FFTs on the center channel.

The various embodiments have been tested using different types of problematic audio content, including solo piano, ocean sounds, and music and voice recordings. Overall, the methods are relatively robust and effective, possibly because they are less ambitious in scope than the ambience-extraction methods since (with the exception of one embodiment above) they do not attempt to upmix the input into center, side and surround components. The lack of obvious center channel artifacts is particularly important when attempting to boost the center channel to enhance dialogue clarity.

It appears that when multiple stages of signal decomposition are performed, the outputs of later stages may suffer in quality compared to the earlier outputs. If this is true, then for speech enhancement it may be advantageous to extract the center channel before extracting the side and surround channels.

Figure 14:
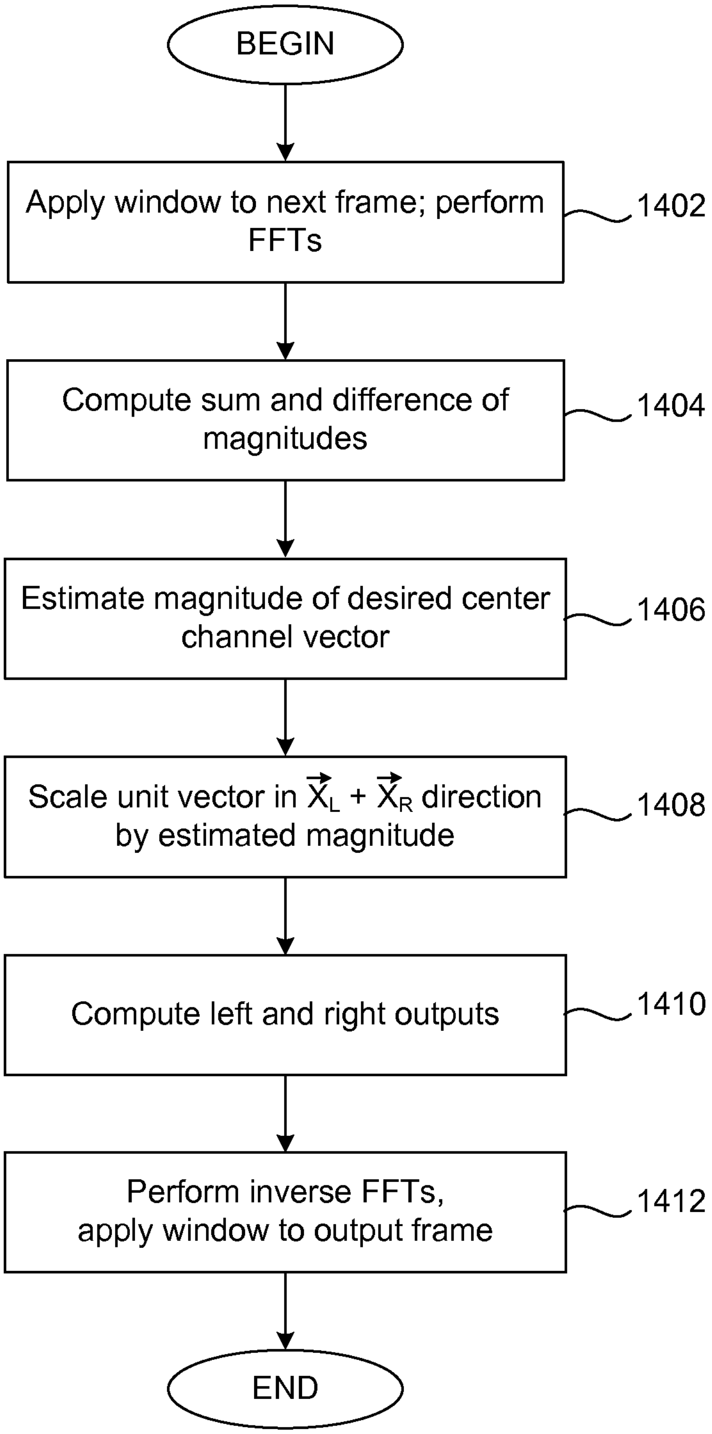
FIG. 14 is a flow diagram of a process of upmixing a 2-channel stereo input signal to a 3-channel output signal having a left, right, and center channels in accordance with various embodiments of the present invention.
Figure 15:
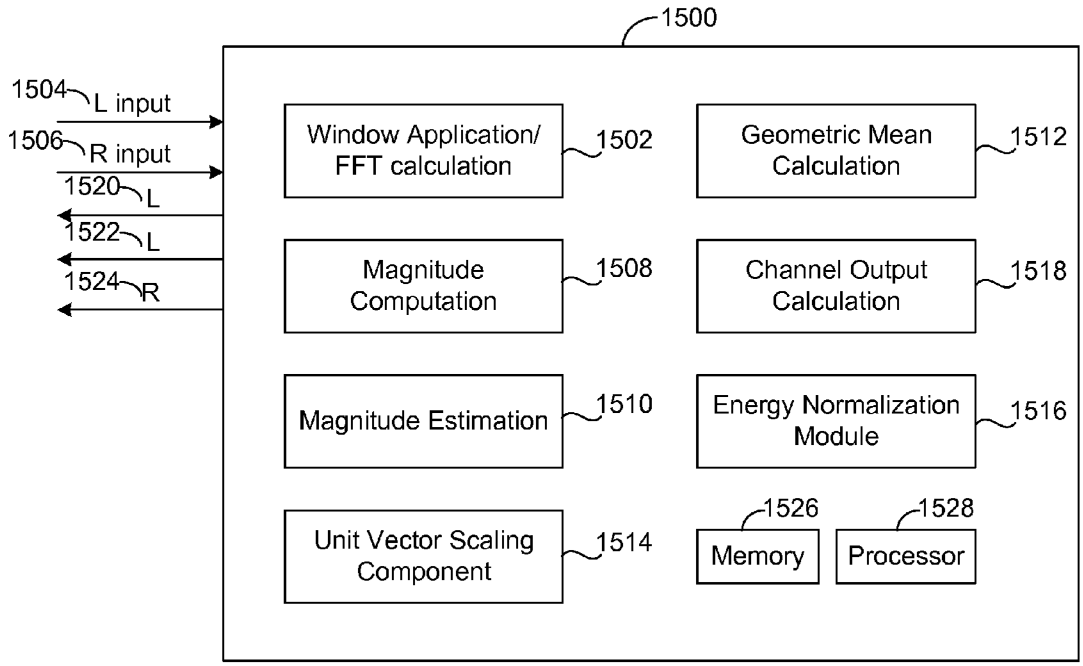
FIG. 15 is a block diagram of an apparatus for upmixing a two-channel stereo input to a three-channel output signal in accordance with one embodiment.

FIG. 14 is a flow diagram of a process of upmixing a 2-channel stereo input signal to a 3-channel output signal having left, right, and center channels in accordance with various embodiments of the present invention. These steps have been described in more detail throughout the above but are repeated here summarily to facilitate a concise understanding and overview of various embodiments of the present invention. Alternative embodiments, such as those including optional steps in the processes, are also described. FIG. 15 is a block diagram of an apparatus 1500, such as a chip or hardware module, for upmixing a two-channel stereo input to a three-channel output signal in accordance with one embodiment. For example, the upmixing functionality may be implemented as a "system-on-a-chip," which may in turn be a hardware component or module in an audio component, consumer electronic device, or other computing device. FIG. 15 is described in tandem with the steps of FIG. 14.

At step 1402, module 1502 applies a multiplicative analysis window (such as the square root of a Hanning or Hamming window) to the next overlapping frame of time-domain data, and Fast Fourier Transforms (FFTs) are performed. As is known in the art, a Hanning window is a Gaussian-shaped window that may be applied to blocks (e.g., 4096 samples) of time-domain data in order to eliminate discontinuities at the start and end of a window of data. The square root may be used so that the product of the analysis (input) and synthesis (output) windows equals a Hanning, Hamming or similar window. The left and right input signals 1504 and 1506 are multiplied by the window, and FFTs are then performed on the windowed data. As noted, these are performed by module 1502. In another embodiment, there may be a windowing application module and a separate module for performing the FFTs.

At step 1404 a magnitude computation module 1508 produces the magnitude of the sum and the magnitude of the difference of the left and right inputs:

$$\zeta = \|\vec{X}_L + \vec{X}_R\|$$

$$\delta = \|\vec{X}_L - \vec{X}_R\|$$

At step 1406 a magnitude estimation module 1510 provides an estimate of the magnitude of the desired center output channel vector:

$$\|\vec{C}\| = \sqrt{0.5}(\zeta - \delta)$$

As discussed above, the square root of 0.5 coefficient provides 0 dB power gain for inputs panned to hard-left, hard-right and center; it also ensures zero panning error. In another embodiment, before step 1406, a "geometric mean" modification may be performed on the difference magnitude calculated at step 1404. The equation for performing this modification may be $$\hat{\delta} = \sqrt{\delta((1-k)\delta + k\zeta)}$$

This modification may improve center channel selectivity and is performed by geometric mean calculation module 1512.

At step 1408 a unit vector in the direction of $X_L+X_R$ is obtained and scaled by the estimated center magnitude derived at step 1406. This is performed by unit vector scaling component 1514 using the equation:

$$\vec{C}=\frac{(\vec{X}_L+\vec{X}_R)\|\vec{C}\|}{\|\vec{X}_L+\vec{X}_R\|+\varepsilon}$$

At step 1410 the left and right channel outputs are computed:

$$\vec{L}=\vec{X}_L-\sqrt{0.5}\vec{C}$$

$$\vec{R}=\vec{X}_R-\sqrt{0.5}\vec{C}$$

In another embodiment, energy normalization may be performed by scaling the outputs $\vec{L}$, $\vec{C}$, and $\vec{R}$ by q, where $$q=\frac{\sqrt{\vec{X}_L^H\vec{X}_L+\vec{X}_R^H\vec{X}_R}}{\sqrt{L^HL+R^HR+C^HC+\varepsilon}}.$$

This is performed by energy normalization module 1516.

At step 1412 inverse FFTs are performed on the left, center, and right channel frequency-domain data by module 1502, to yield left, center, and right channel time-domain data. Multiplicative windows, such as the square root of a Hanning or Hamming window, are applied to the resulting time-domain data, yielding windowed left, center, and right channel signals. Finally, a conventional overlap-add process is applied to the windowed signals to obtain the left, center, and right channel audio outputs 1520, 1522, and 1524, by channel output calculation module 1518. Other components of device 1500 may include memory components 1526, such as cache, RAM, and other types of persistent and non-persistent data storage components. There may also be a suitable processor 1528 suitable for carrying out the functionality described herein. After step 1412, the process for upmixing from two to three channels is complete.

Figure 16:
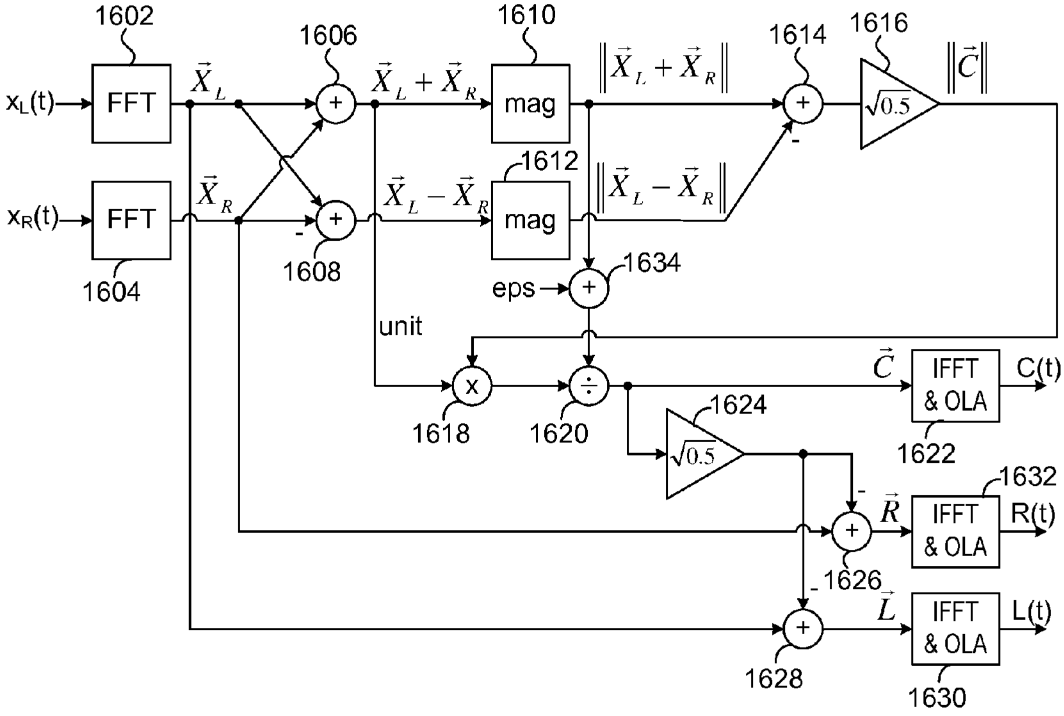
FIG. 16 is a block diagram of a two-to-three channel upmix algorithm in accordance with one embodiment.

FIG. 16 is a block diagram of a two-to-three channel upmix algorithm in accordance with one embodiment. It shows steps described in FIG. 14 and some of the components in FIG. 15 in greater detail. Starting at the left side of the diagram, left and right time domain inputs, $X_L(t)$ and $X_R(t)$, are processed by windowing and FFT modules 1602 and 1604, respectively. The outputs of the windowing and FFT modules, $\vec{X}_L$ and $\vec{X}_R$, are added by adder 1606, producing sum value $\vec{X}_L+\vec{X}_R$, and subtracted by adder 1608, producing difference value $\vec{X}_L-\vec{X}_R$. These sum and difference values are input to magnitude modules 1610 and 1612 creating sum magnitude $\zeta=\|\vec{X}_L+\vec{X}_R\|$ and difference magnitude $\delta=\|\vec{X}_L-\vec{X}_R\|$. Adder 1614 subtracts the difference magnitude from the sum magnitude. The output of adder 1614 is then input to gain component 1616 where a gain of the square root of 0.5 is applied, producing $\|\vec{C}\|=\sqrt{0.5}(\zeta-\delta)$. This output is a magnitude estimation of the desired center output channel. Multiplier 1618 multiplies this magnitude estimate by sum value $\vec{X}_L+\vec{X}_R$ to yield a product. Adder 1634 adds the sum magnitude to a small positive number, $\epsilon$, to yield a sum. A divider 1620 divides the product from multiplier 1618 by the sum from adder 1634, creating $$\vec{C}=\frac{(\vec{X}_L+\vec{X}_R)\|\vec{C}\|}{\|\vec{X}_L+\vec{X}_R\|+\varepsilon}.$$

The output from divider 1620 is input to inverse FFT, windowing and overlap-adding component 1622 to produce a time-domain center output, C(t). The output from divider 1620 is also input to gain 1624, which scales its input by the square root of 0.5. The output from gain 1624 is input to adder 1626 and adder 1628. Adder 1626 also accepts as input $\vec{X}_R$ and adder 1628 accepts as input $\vec{X}_L$. The output from gain 1624, $\sqrt{0.5}\vec{C}$, is subtracted from $\vec{X}_R$ and $\vec{X}_L$ by the respective adders. The outputs, $\vec{L}$ and $\vec{R}$, are input to modules 1630 and 1632 where inverse FFTs are performed to obtain time-domain data and multiplicative windows are applied to the time-domain data. An overlap-add process is applied to the windowed signal to obtain the center, right, and left output channels from modules 1622, 1632 and 1630, respectively.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

While this invention has been described in terms of a specific embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. A method of upmixing a two-channel audio signal to a three-channel audio signal, the method comprising:

computing in a computing device a sum magnitude by calculating the magnitude of a sum of a left input vector and a right input vector, wherein the left and right input vectors are related to a left audio channel and a right audio channel, respectively, of the two-channel audio signal;

computing a difference magnitude by calculating the magnitude of a difference of the left input vector and the right input vector;

using the sum magnitude and the difference magnitude to obtain an estimated center output magnitude;

calculating in the computing device a center output vector using the estimated center output magnitude;

computing in the computing device a left output vector; and computing in the computing device a right output vector, wherein the left, center, and right vectors are related to left, center, and right audio channels, respectively, of the three-channel audio signal.

2. The method as recited in claim 1 wherein calculating in the computing device a center output vector further comprises:

scaling a unit vector having a direction corresponding with the sum of the left input vector and the right input vector by the estimated center magnitude.

3. The method as recited in claim 1 wherein computing in the computing device a left output vector further comprises:

scaling the center output vector to yield a scaled center output vector; and subtracting the scaled center output vector from the left input vector to yield the left output vector.

4. The method as recited in claim 1 wherein computing in the computing device a right output vector further comprises:

scaling the center output vector to yield a scaled center output vector; and subtracting the scaled center output vector from the right input vector to yield the right output vector.

5. The method as recited in claim 1 further comprising:

modifying the difference magnitude of the left input vector and the right input vector by taking the geometric mean of the sum magnitude and the difference magnitude.

6. The method as recited in claim 1 further comprising:

computing a quotient of an input energy and an output energy; and performing energy normalization by taking the product of the left output vector and the quotient, the product of the right output vector and the quotient, and the product of the center output vector and the quotient.

7. The method as recited in claim 1 wherein the center output vector is used for voice enhancement.

8. The method as recited in claim 1 wherein obtaining an estimated center output magnitude further comprises:

determining a magnitude difference between the sum magnitude and the difference magnitude; and multiplying the magnitude different by a constant.

9. The method as recited in claim 1 wherein obtaining an estimated center output magnitude further comprises:

using a recursive smoothing filter to smooth the estimated center output magnitude.

10. The method as recited in claim 1 further comprising:

receiving in the computing device a stereo signal having a left input and a right input.

11. The method as recited in claim 10 wherein receiving in the computing device a stereo signal further comprises:

windowing a next overlapping frame of time-domain data representing the stereo signal; and performing an FFT operation on the time-domain data to obtain the left input vector and the right input vector.

12. The method as recited in claim 1 further comprising:

performing inverse FFT operations in the computing device on the left output vector, center output vector, and right output vector, and overlap-adding them to yield a left time-domain output, a center time-domain output, and a right time-domain output.

13. An apparatus for upmixing a two-channel audio input to a three-channel audio output, the apparatus comprising:

a magnitude computation module adapted to receive a left input vector and a right input vector relating to left and right audio channels, respectively, of the two-channel audio input and to compute a sum magnitude and a difference magnitude using the left input vector and the right input vector;

a magnitude estimation module adapted to compute an estimated center magnitude of a target center output vector using the sum magnitude and the difference magnitude; and an output vector computation module adapted to calculate a center output vector using the estimated center magnitude and to compute a left output vector, and a right output vector, the center output vector, the left output vector, and the right output vector relating to center, left and right audio channels, respectively, of the three-channel audio output.

14. The apparatus as recited in claim 13 further comprising:

a scaling component adapted to receive an estimated center magnitude and to scale a unit vector having a direction corresponding with the sum of the left input vector and the right input vector using the estimated center magnitude.

15. The apparatus as recited in claim 13 wherein the output vector computation module accepts as input the left input vector, the right input vector, and the estimated center magnitude.

16. The apparatus as recited in claim 13 further comprising:

a geometric mean computation module adapted to modify the difference magnitude of the left input vector and the right input vector.

17. The apparatus as recited in claim 13 further comprising:

an energy normalization module adapted to normalize energy of the center output vector, the left output vector, and the right output vector.

18. The apparatus as recited in claim 17 wherein the energy normalization module is further adapted to compute a quotient of an input energy and an output energy, and to perform multiplication of the left output vector by the quotient, multiplication of the right output vector by the quotient, and multiplication of the center output vector by the quotient.

19. A method of upmixing a two-channel audio signal to a five-channel audio output signal, comprising:

upmixing in a computing device left and right input vectors relating to left and right audio channels, respectively, of the two-channel audio signal to a three-channel signal having an intermediate left output vector, an intermediate center output vector, and an intermediate right output vector;

upmixing the intermediate left output vector and the intermediate center output vector to create a left output vector, a center-left output vector, and a first center output vector;

upmixing the intermediate center output vector and the intermediate right output vector to create a second center output vector, a center-right output vector, and a right output vector;

adding the first center output vector to the second center output vector and scaling the sum to produce a final center output vector; and outputting from the computing device the five-channel audio output signal, wherein the left, center-left, final center, center-right, and right output vectors are related to left, center-left, center, center-right, and right audio channels, respectively, of the five-channel audio output signal.

20. A method of improving the center channel selectivity of an upmix process, the method comprising:

computing in a computing device a magnitude similarity measure relating to similarity of a left input vector magnitude and a right input vector magnitude, wherein the left and right input vectors are related to a left audio channel and a right audio channel, respectively, of a two-channel audio input signal;

scaling a center magnitude estimate by the magnitude similarity measure to produce a scaled center magnitude estimate;

calculating in the computing device a center output vector using the scaled center magnitude estimate;

computing in the computing device a left output vector by subtracting a first portion of the center output vector from the left input vector; and computing in the computing device a right output vector by subtracting a second portion of the center output vector from the right input vector, wherein the left, center, and right vectors are related to left, center, and right audio channels, respectively, of a three-channel audio output signal.

21. The method as recited in claim 20 wherein computing in a computing device a magnitude similarity measure further comprises:

determining the minimum value of the left input vector magnitude and the right input vector magnitude;

determining the maximum value of the left input vector magnitude and the right input vector magnitude; and dividing the minimum value by the maximum value to derive the magnitude similarity measure.

22. The method as recited in claim 20 further comprising raising the magnitude similarity measure to a power greater than one, thereby achieving additional center channel selectivity.

23. The method as recited in claim 20 further comprising:

multiplying the magnitude similarity measure by π divided by two, thereby obtaining a modified magnitude similarity measure; and taking the sine function of the modified magnitude similarity measure.

24. The method as recited in claim 20 further comprising:

limiting the magnitude similarity measure to a specific range to limit noise artifacts.

25. A method of extracting a left ambience vector and a right ambience vector from a left vector and a right vector, where the left and right vectors are related to a left audio channel and a right audio channel, respectively, of a two-channel audio input signal, the method comprising:

computing in a computing device a magnitude similarity measure relating to the similarity of the magnitudes of the left vector and the right vector;

computing the left ambience vector by multiplying π the left vector by the magnitude similarity measure;

computing the right ambience vector by multiplying the right vector by the magnitude similarity measure;

computing in the computing device a left output vector by subtracting the left ambience vector from the left vector; and computing in the computing device a right output vector by subtracting the right ambience vector from the right vector, wherein the left and right output vectors are related to left and right audio channels, respectively, of an audio output nal.

26. An apparatus for upmixing a two-channel audio signal to a three-channel audio signal, the apparatus comprising:

means for receiving a left input vector and a right input vector related to left and right audio channels, respectively, of the two-channel audio signal and for computing a sum magnitude by calculating the magnitude of a sum of a left input vector and a right input vector and for computing a difference magnitude by calculating the magnitude of a difference of the left input vector and the right input vector;

means for using the sum magnitude and the difference magnitude to obtain an estimated center output magnitude;

means for calculating a center output vector related a center channel of to the three-channel signal using the estimated center output magnitude; and means for computing a left output vector and a right output vector related to left and right audio channels, respectively, of the three-channel audio signal.

27. The apparatus as recited in claim 26 wherein means for calculating a center output vector further comprises:

means for scaling a unit vector having a direction corresponding with the sum of the left input vector and the right input vector by the estimated center magnitude.

28. The apparatus as recited in claim 26 wherein means for computing a left output vector further comprises:

means for scaling the center output vector to yield a scaled center output vector and for subtracting the scaled center output vector from the right input vector to yield the right output vector.

29. The apparatus as recited in claim 26 wherein means for computing a right output vector further comprises:

means for scaling the center output vector to yield a scaled center output vector and for subtracting the scaled center output vector from the right input vector to yield the right output vector.

30. The apparatus as recited in claim 26 further comprising:

means for modifying the difference magnitude of the left input vector and the right input vector by taking the geometric mean of the sum magnitude and the difference magnitude.

31. The apparatus as recited in claim 26 further comprising:

means for computing a quotient of an input energy and an output energy and for performing energy normalization by taking the product of the left output vector and the quotient, the product of the right output vector and the quotient, and the product of the center output vector and the quotient.

32. An apparatus for upmixing a two-channel audio signal to a five-channel audio output signal, the apparatus comprising:

means for upmixing a left audio channel and a right audio channel of the two-channel audio signal to a three-channel signal having an intermediate left output vector, an intermediate center output vector, and an intermediate right output vector;

means for upmixing the intermediate left output vector and the intermediate center output vector to create a left output vector, a center-left output vector, and a first center output vector;

means for upmixing the intermediate center output vector and the intermediate right output vector to create a second center output vector, a center-right output vector, and a right output vector;

means for adding the first center output vector to the second center output vector and scaling the sum to produce a final center output vector; and means for outputting the left output vector, the center-left output vector, the final center output vector, the center-right output vector, and the right output vector as a left audio channel, a center-left audio channel, a center audio channel, a center-right audio channel, and a right audio channel of the five-channel audio output signal.

33. An apparatus for improving the center channel selectivity of an upmix process, the apparatus comprising:

means for calculating a left input vector and a right input vector based on a left audio channel and right audio channel, respectively, of a two-channel audio signal;

means for computing a magnitude similarity measure relating to similarity of a left input vector magnitude and a right input vector magnitude;

means for scaling a center magnitude estimate by the magnitude similarity measure to produce a scaled center magnitude estimate;

means for calculating a center output vector using the scale center magnitude estimate;

means for computing a left output vector by subtracting a first portion of the center output vector from the left input vector and for computing a right output vector by subtracting a second portion of the center output vector from the right input vector; and means for calculating a three-channel audio output having a center audio channel, a left audio channel, and a right audio channel based, respectively, on the center output vector, the left output vector, and the right output vector.

34. The apparatus a recited in claim 33 wherein means for computing a magnitude similarity measure further comprises:

means for determining the minimum value of the left input vector magnitude and the right input vector magnitude;

means for determining the maximum value of the left input vector magnitude and the right input vector magnitude; and means for dividing the minimum value by the maximum value to derive the magnitude similarity measure.

* * * * *